April 21, 1959     H. N. STEPHAN     2,882,800
HORIZONTAL BORING, DRILLING AND MILLING MACHINE
Filed March 12, 1954     9 Sheets-Sheet 1

INVENTOR.
HALLIS N. STEPHAN
BY
Hudson, Boughton
Williams, David & Hoffmann
ATTORNEYS April 21, 1959 H. N. STEPHAN 2,882,800
HORIZONTAL BORING, DRILLING AND MILLING MACHINE
Filed March 12, 1954 9 Sheets-Sheet 3

INVENTOR.
HALLIS N. STEPHAN
BY Hudson, Coughton,
Williams, David & Hoffmann
ATTORNEYS

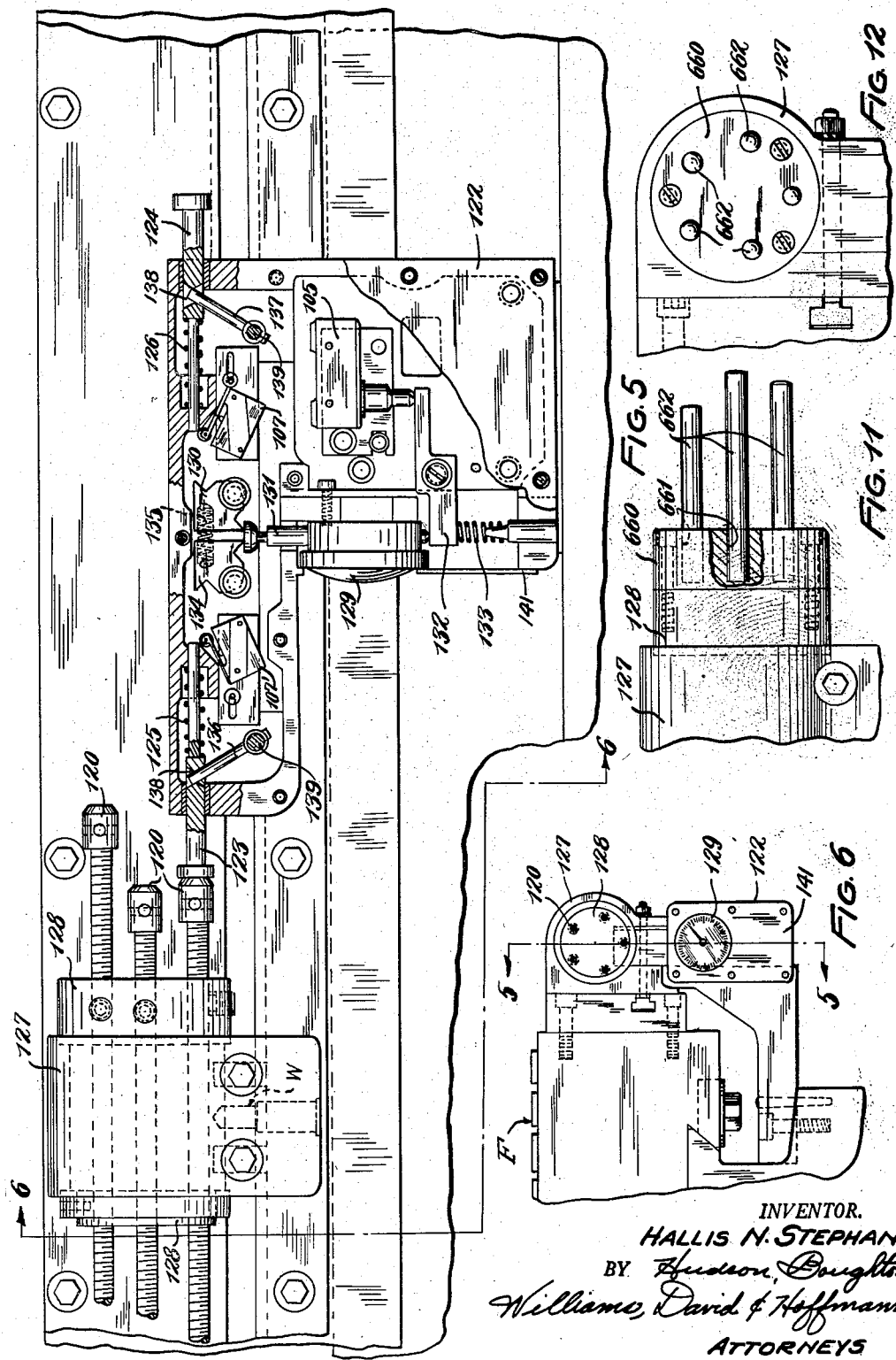

INVENTOR.
HALLIS N. STEPHAN

INVENTOR.
HALLIS N. STEPHAN
BY Hudson, Boughton,
Williams, David & Hoffmann
ATTORNEYS April 21, 1959 H. N. STEPHAN 2,882,800
HORIZONTAL BORING, DRILLING AND MILLING MACHINE
Filed March 12, 1954 9 Sheets-Sheet 9

INVENTOR.
HALLIS N. STEPHAN
BY Hudson, Boughton,
Williams, David & Hoffmann
ATTORNEYS

United States Patent Office 2,882,800
Patented Apr. 21, 1959

2,882,800
HORIZONTAL BORING, DRILLING AND MILLING MACHINE

Hallis N. Stephan, Cleveland Heights, Ohio, assignor to The New Britain Machine Company, New Britain, Conn., a corporation of Connecticut Application March 12, 1954, Serial No. 415,807

1 Claim. (Cl. 90—21)

The present invention relates to machine tools and, more particularly, to a machine tool having means for automatically positioning a movable machine tool element thereof.

The principal object of the present invention is the provision of a new and improved machine tool, particularly a horizontal boring, drilling and milling machine having a power driven machine tool element, such as a tool or spindle head, saddle, table, or the like, movable to a desired position from either of two directions and having novel indexing means for stopping the power driven element at the desired position, regardless of the direction from which the element approaches the position, including means to indicate the accuracy of the final positioning of the element with respect to the desired position.

Another object of the invention is the provision of a novel and improved machine tool, particularly a horizontal boring, drilling and milling machine, comprising a movable machine tool element such as a tool or spindle head, a saddle, or a table, a power means for moving the element and control means for automatically stopping the element at a predetermined position mechanically actuated by the movement of the element to the position from either of two directions, the control for the power driven element being so arranged that the member may be rapid traversed off the predetermined position.

Another object of the present invention is the provision of a new and improved machine tool, particularly a horizontal boring, drilling and milling machine, having a movable machine tool element, power means for moving the element in either of two directions, and a novel indexing mechanism to stop the movable element at a predetermined position regardless of the direction of movement of the member to the position, the indexing means including control means and actuating abutment means therefor which are moved relative to each other in timed relation to the relative movement of the element and its supporting member and being constructed and arranged so as to enable the position at which the indexing mechanism stops the movable element to be readily changed, the indexing means also including mechanism for indicating the accuracy of the final positioning of the movable member.

Another object of the present invention is the provision of a novel and improved indexing mechanism for stopping a power driven member movably supported on a supporting member at a predetermined position with respect to the supporting member, the mechanism including abutment means on one of the members, control means on the other of the members, the control means being actuated by the abutment means when the movable member approaches the predetermined position from either of two directions to first change the rate of movement of the movable member and to subsequently stop it at the predetermined position, and dial indicating means to indicate the accuracy of the positioning of the element with respect to the predetermined position.

The present invention resides in certain constructions and combinations and arrangements of parts and further objects and advantages thereof will be apparent to those skilled in the art to which the invention relates from the following description of the preferred embodiment thereof described with reference to the accompanying drawings forming a part of this specification in which:

Fig. 5 is an enlarged fragmentary view partly in section of a portion of the table and saddle showing the mechanism for positioning the table;

Fig. 6 is a view taken approximately along line 6—6 of Fig. 5;

Figs. 11 and 12 are fragmentary views showing gauge rods and a support therefor particularly suitable for mass production work.

The present invention contemplates the provision of a new and improved machine tool having a movable member to be accurately positioned with respect to a supporting member, power means for moving the movable member to a predetermined position from either of two directions and control means for the power means in combination with actuating means for stopping the member in the predetermined position comprising spaced abutments connected to one of the members, a gauge means connected to the other member for operating the control means to stop the movable member at the predetermined position, the gauge means being located between the spaced abutments and adapted to be moved by one of the abutments when the member approaches the predetermined position from one direction and by the other abutment when the movable member approaches the predetermined position from the other position to actuate the control means to stop the member at the predetermined position, and means for measuring the movement of the gauge means to indicate the accuracy of the positioning of the movable member. Preferably, the spaced abutments cause the operation of a control means which is adapted to change the movement of the movable member from a traverse rate to a feed rate prior to the actuation of the control means for stopping the movement of the movable member at the predetermined position. In the preferred embodiment, the spaced abutments comprise two sets of rods mounted in separate turret members located at points close to the opposite ends of the movable element, the rods being of different lengths and each being movable into position to actuate the control means for stopping the movable member by rotation of the turrets. The use of a set of rods of different lengths enables the machine to be set up so that the table may be indexed to various positions by merely rotating the turret to locate a rod of different length in the proper position to actuate the stop control.

Although the invention is susceptible of various modifications and alternative constructions and use in various types of machine tools, it is particularly applicable to and is herein shown and described as embodied in an electrically operated and controlled combined horizontal boring, drilling and milling machine of the general character shown in U.S. Patent No. 2,339,435 to Stephan issued January 18, 1944. Other means, however, for example, hydraulic means, may be employed to operate and control the machine shown and are comprehended within the scope of this invention.

Figure 3:
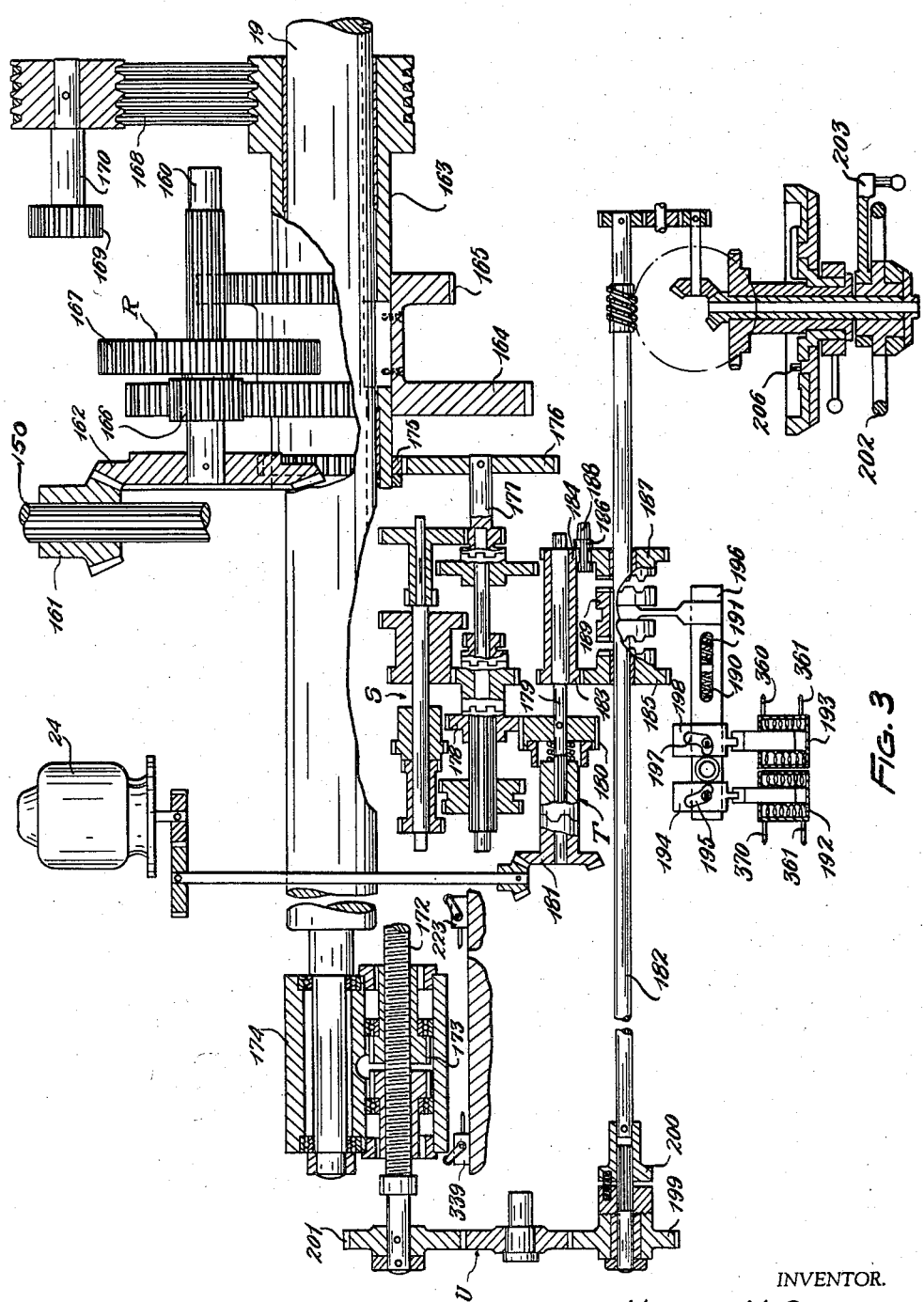
Fig. 3 is a diagrammatic view of the portion of the mechanism for rotating, feeding and traversing the spindle which is located in the spindle head.
Figure 4:
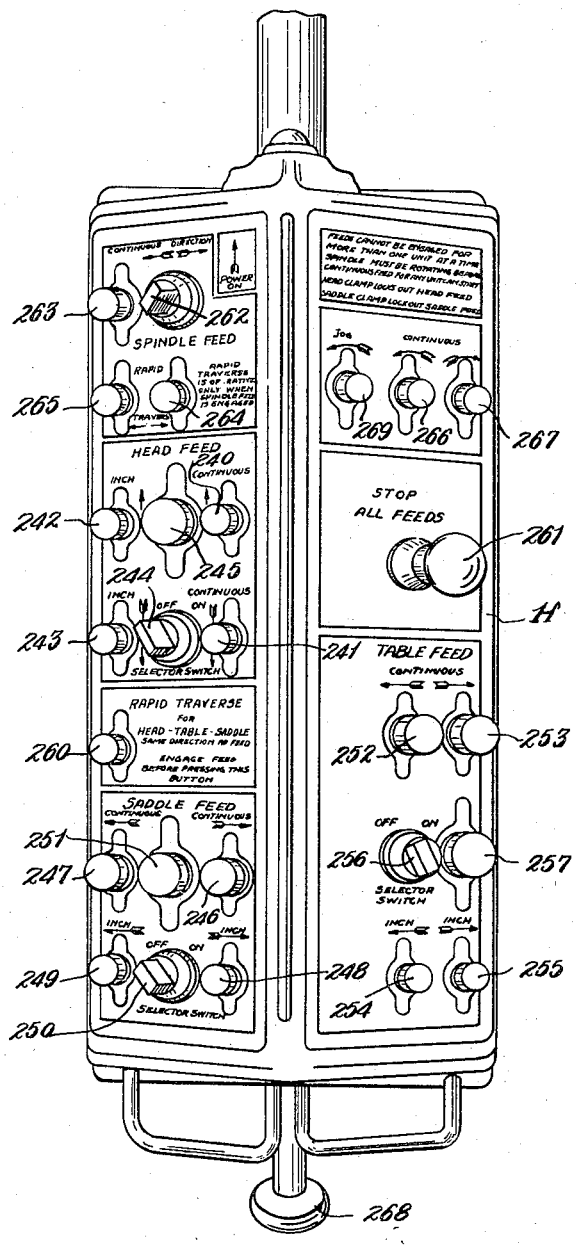
Fig. 4 is a view of the pendant control station.

Referring to the drawings, the machine shown therein comprises a base A, provided at one end with a spindle head column B formed with vertical ways 10 and 11 upon which a spindle head C is mounted for vertical movement, and at the other end with a backrest or outboard support column D slidably supported on horizontal ways 12 and 13, see Fig. 3, formed on the upper side of the bed. The ways 12 and 13 also support a saddle E having transverse horizontal ways 14 and 15 on the upper side which in turn support a work table F. The backrest column D is provided with vertical ways upon which a backrest block G is mounted for vertical movement.

The spindle head which is counterbalanced by a weight (not shown) is adapted to be moved vertically along the ways 10 and 11 by a lead screw 18 rotatably supported in the machine in a suitable manner and having threaded engagement with a nut fixed in the spindle head. In addition to being rotatable in opposite directions, the tool spindle 19 is movable in opposite directions longitudinally of its axis of rotation at different speeds to effect both feeding and traversing movements. The backrest block or outboard support G is movable simultaneously with the movement of the spindle head C by a vertical lead screw 20 located within the backrest column D and connected to the drive or mechanism for rotating the screw 18. The saddle E is movable longitudinally of the tool spindle along the ways 12 and 13 and the table F is movable transversely of the tool spindle along the ways 14 and 15 at different speeds by mechanism hereinafter specifically referred to.

The speed and direction of rotation of the spindle, etc., and the aforesaid movements of the various elements, such as the feed and rapid traverse of the spindle, head, saddle, table, etc., are performed by power and their operation may be controlled from any convenient place about the machine. In the embodiment of the invention shown, five electric motors are employed including a reversible motor 21 hereinafter referred to as the feed and rapid traverse motor, suitably supported on the bed within a guard 22 adjacent to the left-hand end of the machine; a reversible main driving motor 23 (shown in the electrical circuit for the machine), also enclosed within the guard 22; a spindle rapid traverse, reversible motor 24 mounted on the head C; a reversible motor 25 for clamping and releasing the backrest block; and a reversible motor 26 (not shown on the machine) for moving the backrest column D.

The feed and rapid traverse motor 21 is connected to the saddle and table feeding and rapid traversing mechanism and to the spindle head and backrest raising and lowering mechanism, the main driving motor 23 is connected to the spindle rotating and feeding mechanism, and the small reversible motor 24 on the head actuates the rapid traverse for the tool spindle through an overrunning clutch. The feed and main driving motors are adapted to be selectively connected to the various operating elements through the medium of suitable speed change transmissions, shafts, gears, clutches, etc., the controls for which are located on or adjacent to the base A, spindle head C, and/or pendant control station H fixed to the lower end of a tubular rod connected to a universally movable arm 27 by a flexible cable 27a.

Figure 2:
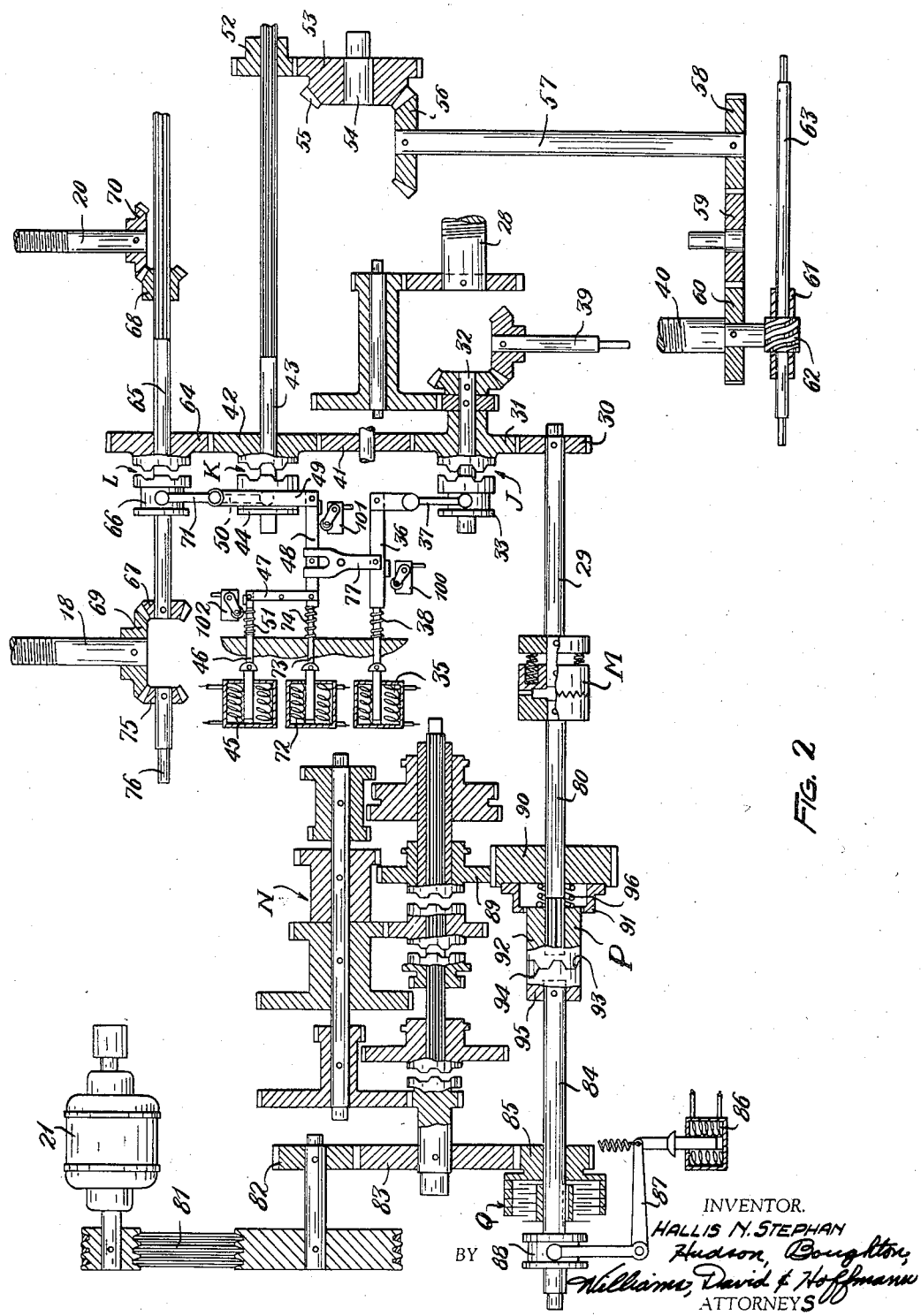
Fig. 2 is a diagrammatic view showing the power drive for reciprocating the saddle and table, and for raising and lowering the spindle head and the backrest lock.

The saddle E is adapted to be moved longitudinally along ways 12, 13 by a lead screw 28 rotatably supported between the ways 12, 13 and a cooperating nut on saddle E. The lead screw 28 is adapted to be selectively connected to a horizontal shaft 29 operatively connected to the feed and rapid traverse motor 21 so as to be rotated thereby. The right-hand end of the shaft 29, as viewed in Fig. 2, is provided with a gear 30 continuously in mesh with the gear 31 rotatably supported on a shaft 32 to which it is adapted to be selectively connected by a normally disengaged positive drive clutch J, the driven element 33 of which is splined on the left-hand end of the shaft 32 and provided with clutch teeth adapted to engage clutch teeth formed on the hub of the gear 31. The shaft 32 is operatively connected by gearing to the lead screw 28.

The movable element 33 of the normally disengaged clutch J is adapted to be moved toward the right, as viewed in Fig. 2, to engage the clutch and thereby connect the lead screw 28 to the shaft 29 and in turn the feed and rapid traverse motor 21 by an electric solenoid 35 suitably supported in the base A of the machine, the armature of which solenoid is connected to the slidable clutch element 33 by a slidable rod 36 and a pivoted yoke member 37. The clutch is normally held in disengaged position by a compression spring 38 surrounding the rod 36 and interposed between the frame of the machine and a shoulder on the rod 36. A hand feed is provided for the saddle E in the form of a rotatable shaft 39, the front end of which projects to the front of the machine where it is arranged for the reception of a hand crank.

The table F is adapted to be moved along the ways 14 and 15 of the saddle E by a lead screw 40 rotatably supported in the saddle and operatively connected to a suitable nut fixed to the underside of the table. The lead screw 40 is adapted to be selectively connected to the shaft 29 in a manner similar to that in which the lead screw 28 is selectively connected to said shaft 29, which manner of connection has just been described. The gear 31 journaled on the shaft 32 is continuously in mesh with a gear 41 which in turn is continuously in mesh with a gear 42 journaled on a shaft 43 rotatably supported in the base A and extending substantially the length thereof.

The gear 42 is adapted to be selectively connected to the shaft 43 by a normally disengaged, positive drive tooth clutch K similar to the clutch J. The slidable element 44 of the clutch K is splined to the left-hand end of the shaft 43 and is moved towards the right to engage the teeth thereof with teeth formed on the hub of gear 42 by an electric solenoid 45, the armature of which is adapted to be connected to the movable clutch element 44 through the medium of a slidable rod 46 connected to the armature and to one end of a pivoted lever 47, the opposite end of which lever is connected to a slidable rod 48 which in turn is connected to a pivoted lever 49 carried by a short shaft journaled in the frame, to the lower end of which shaft is secured a clutch operating yoke 50 that engages in a groove formed in the movable clutch member 44. The pivoted lever 49 is continuously urged in a clockwise direction, as viewed in Fig. 2, by a compression spring 51 interposed between the frame of the machine and a shoulder on the lever 46. The construction is such that upon energization of the solenoid 45, the armature is moved towards the left, rotating the member 49 in a counterclockwise direction and engaging the clutch K.

The shaft 43 is operatively connected to the lead screw 40 in the following manner: A gear 52 carried by the saddle E and splined to the shaft 43 is continuously in mesh with a gear 53 journaled on a shaft 54 and formed integral with a bevel gear 55. The bevel gear 55 meshes with a bevel gear 56 fixed to the rear end of a transverse shaft 57 rotatably supported in the saddle E, the forward end of which is connected to the lead screw 40 by change gears 58, 59 and 60, the first of which is keyed to the forward end of the shaft 57 and is continuously in mesh with the idler gear 59, which in turn meshes with the gear 60 keyed to the lead screw 40. The forward end of the lead screw is provided with a worm wheel 61 continuously in mesh with the worm 62 fixed to a shaft 63 journaled in the saddle and extending longitudinally of the machine. The ends of the shaft 63 project from opposite sides of the saddle and are arranged for the reception of a hand crank.

The lead screw 18 which raises and lowers the spindle head and the lead screw 20 which raises and lowers the backrest block are adapted to be selectively connected to the shaft 29 in a manner similar to that in which the lead screws 28 and 40 are connected to the shaft 29. For this purpose, the gear 42 is continuously in mesh with a gear 64 journaled on a longitudinally extending shaft 65 to which it is adapted to be operatively connected by a normally disengaged tooth clutch L, similar in construction to the clutches J and K previously referred to, the movable element 66 of which is splined to the shaft 65. The shaft 65 carries two bevel gears 67 and 68 continuously in mesh with bevel gears 69 and 70, respectively, fixed to the lower end of the lead screws 18 and 20, respectively. The gear 68 is splined to the shaft 65 and moves therealong with movement of the outboard column D.

The movable element 66 of the clutch L is adapted to be shifted longitudinally of the shaft 65 to engage and disengage the clutch by a pivoted clutch yoke member 71 formed integral with the clutch yoke member 50. The clutch yoke 71 is adapted to be rotated in a clockwise direction about its pivot to engage the clutch L by an electric solenoid 72, the armature of which is connected to the lower end of the pivoted lever 47 by a slidable rod 73. A compression spring 74 surrounding the rod 73 and interposed between the frame of the machine and a shoulder on the lever 73 normally maintains the clutch L disengaged. The gear 69 fixed to the lower end of the lead screw 18 is also engaged by a bevel gear 75 fixed to the rear end of a shaft 76 projecting to the front of the machine where it is arranged for the reception of the hand crank. This construction provides means for manually raising or lowering the spindle head and the backrest block. The slidable members 36 and 48 are mechanically interlocked by a Y-shaped member 77 pivotally supported intermediate its ends by the frame of the machine in such a manner that by moving one the other can be pulled into its neutral position.

The feed and rapid traverse motor 21 is operatively connected to a horizontally extending shaft 80 rotatably supported in the base A, through the medium of a V-belt drive 81 and spur gears 82 and 83 the shaft 80 being connected to shaft 29 through a normally engaged overload release clutch M. From the gear 83 the drive is either at a relatively slow or feeding rate through a variable feed change transmission, designated generally by the reference character N, and an overrunning clutch device, designated generally by the reference character P, or at a relatively high or traversing rate through a normally disengaged disk clutch Q, a shaft 84, and the overrunning clutch mechanism P. The feed change gears, etc., are housed within a suitable gear box in the base A. Through the medium of the transmission N, the shaft 80 may be rotated at various speeds, and through the medium of the normally disengaged friction clutch Q, the driving element of which is carried by a gear 85 continuously in mesh with the gear 83, the shaft 80 may be selectively rotated at a high rate of speed. The gear 83 is keyed to the driven shaft of the feed change transmission N and the gear 85 is journaled on the shaft 84. The driven element of the friction clutch Q is splined to a shaft 84, which shaft is in axial alignment with the shaft 80 and is adapted to be actuated to engage the clutch Q upon energization of an electrically-operated solenoid 86 connected to one lever of a bell crank lever, 87 pivoted on the frame, the other lever of which is connected to a member 88 which in turn actuates the clutch elements.

The last or driving gear 89 of the transmission N is continuously in mesh with a gear 90 which forms the low speed element of the overrunning clutch mechanism P. The gear 90 is rotatably supported on the shaft 84 and carries the driving element 91 of a normally engaged toothed clutch, the driven element 92 of which is splined on the shaft 80. The left-hand end of the driven element 92, as viewed in Fig. 2, has a plurality of sloping teeth or cam surfaces 93 which cooperate with similar teeth 94 on a high speed driving member 95 fixed to the right-hand end of the high speed shaft 84. The member 92 is continuously urged towards the left, as viewed in Fig. 2, by a compression spring 96 interposed therebetween and the gear 90. The construction is such that the shaft 80 is normally connected to the transmission N through the normally engaged clutch elements 91 and 92 and the gears 89 and 90, with the shaft 84 rotating at the same speed as the shaft 80 due to the engagement of the teeth 93 and 94.

Upon engagement of the friction clutch Q, the shaft 84 is rotated at a higher rate of speed than the shaft 80. This difference in speed causes the teeth 93 of the slidable clutch element 92 to climb the teeth 94 of the element 95 carried by the shaft 84, with the result that the slidable clutch element 92 is moved towards the right, disengaging the teeth thereof from the teeth of the clutch element 91, which in turn disengages the low speed drive. Thereafter, the shaft 80 rotates at the same high speed as the shaft 84. Movement of the member 92 towards the right is limited by the compression spring 96, and the construction is such that the cooperating teeth 93 and 94 are never permitted to clear each other. Both sides of the teeth 93 and 94 are inclined which makes the device operable for either direction of rotation of the motor 21. When the clutch Q is released, the spring 96 reengages the cooperating clutch teeth of elements 91 and 92, and reconnects the feed to the shaft 80 in place of the rapid traverse.

The transmission N shown comprises four shiftable elements for obtaining different feeds. These elements may be moved in any convenient manner. The mechanism for moving the shiftable elements of the transmission N per se forms no part of the present invention and will not be described in detail.

From the foregoing, it will be apparent that the saddle, table, spindle head, and backrest block may be operated selectively either manually or by the reversible feed and rapid traverse motor 21. If operated by the motor 21, the movements may be in either direction and at either a feed rate or a rapid traverse rate. The arrangement of the clutches for moving the saddle, table, and spindle head and backrest block is such that it is impossible to simultaneously engage two clutches. The manner in which the solenoids 35, 45, 72, and 86 are energized will be hereinafter more specifically referred to. The construction also includes three double throw electric switches 100, 101, and 102, the former of which is operatively connected to the rod 36 in such a manner that a normally open circuit therethrough is closed and two normally closed circuits therethrough are opened when the clutch J is engaged, and vice versa. The switch 101 is operatively connected to the rod 48 in a manner similar to that in which the switch 100 is connected to the rod 36, and one of the three circuits through the switch 101 is closed when the clutch L is engaged and when disengaged the other two circuits are closed, and vice versa. The switch 102 is operatively connected to the rod 46 in such a manner that a normally open circuit therethrough is closed and two normally closed circuits therethrough are opened when the clutch K is engaged, and vice versa. The function of these switches will be hereinafter referred to. The machine also includes a number of normally closed limit switches which stop the feed and rapid traverse motor 21 when the particular element, that is, head, saddle, or table, being moved thereby, reaches the end of its travel. These limit switches are interlocked in a manner hereinafter described so that the limit switches of the elements not being moved will not interfere with the actuation of the element which it is desired to feed or rapid traverse.

Reciprocation of the table F is adapted to be automatically controlled by six limit switches 103, 104, 105, 106, 107, and 107'. The limit switches 103, 104, and 105 are normally closed switches and control the feed movement, and the limit switches 106, 107, and 107' control the rapid traverse movement.

The switches 107 and 107' are normally closed and each has a pair of normally open back contacts which are closed when the switches are operated for reasons as will appear hereinafter. The table back and forward limit switches 103, 104 respectively are shown only in the circuit diagram and are adapted to be opened by downwardly extending projections on stops which may be secured to the table to control the limitation of the table movement. These stops may include fixed stops and adjustable stops to provide a wide range of table control. The details of such stops and their locations are set out in the aforesaid patent and are not illustrated or described herein in detail.

The double throw table jump feed rapid traverse switch 106 shown only in the circuit diagram is so located in the control circuit that the solenoid 86 is energized and the rapid traverse drive made operative upon the closing of normally open contacts thereof. The switch may be operated by a plurality of stops, shown and described in detail in the aforesaid patent, which are adapted to actuate the operating mechanism for the switch 106 also described in detail in the aforesaid patent.

Figure 1:
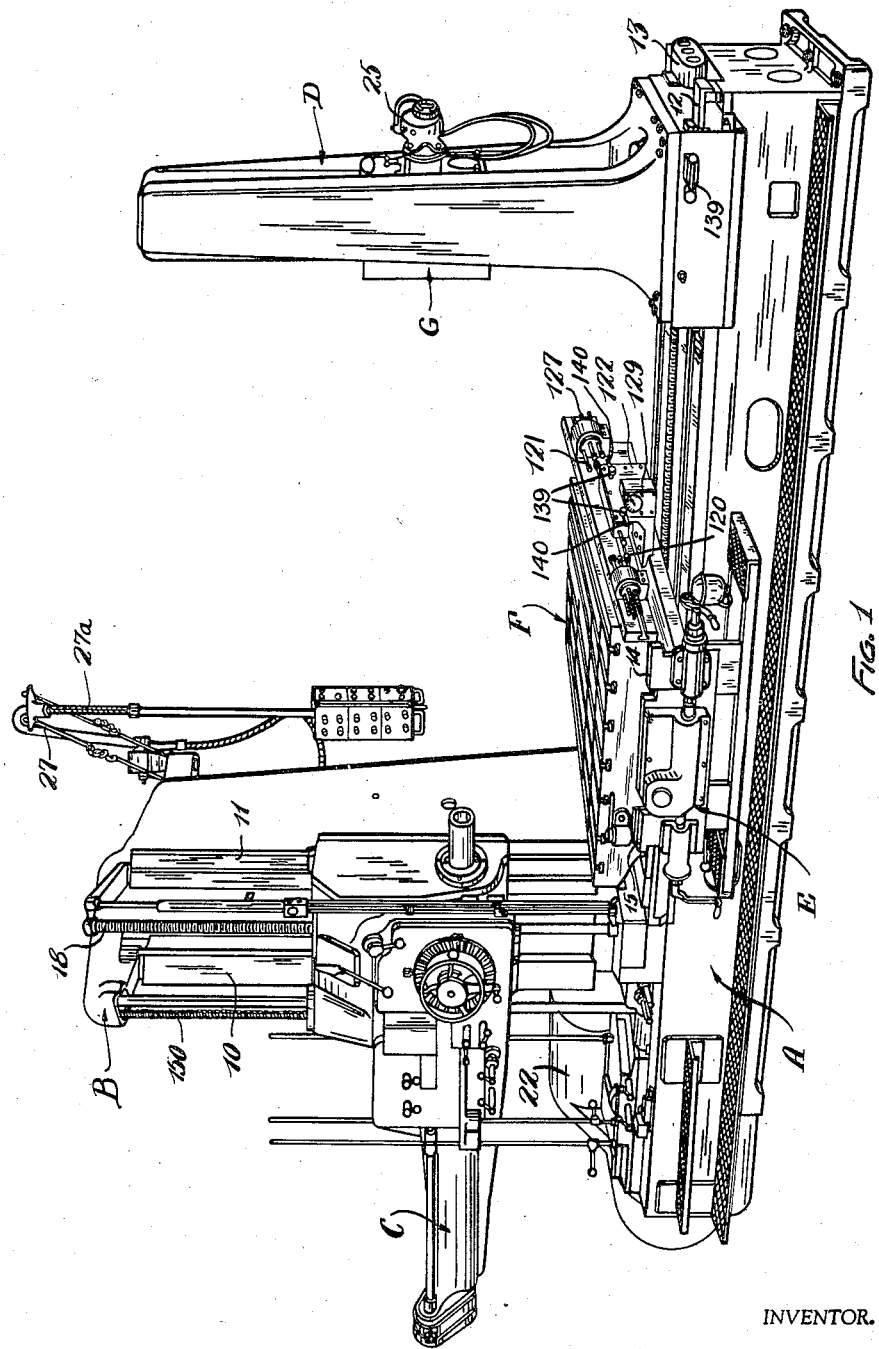
Fig. 1 is a front perspective view of a horizontal boring machine embodying the present invention.

The automatic positioning of table F with respect to saddle E is controlled by spaced sets of push rods 120, 121 located on the forward end and the rear end respectively of the right-hand side of the table, as it is viewed in Fig. 1. The push rods extend inwardly toward the center of the table to provide spaced abutments and are adapted to operate automatic index feed limit switch 105, dial indicator rapid tranverse table forward switch 107, and dial indicator rapid tranverse table back switch 107', adjustably mounted in a housing 122 supported on the saddle E, by moving inwardly horizontal measuring or gauge rods 123, 124 projecting from the forward and rear sides respectively of the housing 122. The measuring rods 123, 124 are spring biased outwardly by compression springs 125, 126 respectively coiled about the rods. The springs engage a shoulder on the respective measuring rod at one end and a shoulder within the housing 122 at the other end.

A plurality of push rods may be provided at each end of the table as illustrated to facilitate setting up a machine for various movements. To enable the desired push rod to be moved to a position in line with the measuring rods 123, 124 each set of rods is supported in a turret head 127 adjustably mounted on the table F for longitudinal movement along the table and having a rotatable member 128 with threaded apertures therein to receive the measuring rods 120, 121 and detent mechanism W for holding the member 128 in a desired position. The push rods 120, 121 may be threaded in and out of the apertures to control the final position of the table.

If the saddle is being rapid traversed in a forward direction toward the desired position the push rod 121 in line with the measuring rod 124 will move the rod 124 inwardly against the action of spring 126. The inward movement of measuring rod 124 immediately operates switch 107 to open the switch and deenergize the rapid traverse solenoid 86 thereby causing the movement of the table to change from that of rapid traverse to feed. As the table continues to approach the desired position at the feed rate the measuring rod will be moved inwardly by the push rod 121 until the table reaches the desired position which is determined by the length of the push rod. When the table reaches this position the push rod 121 will operate, through the measuring rod and other suitable mechanism including a dial indicator 129 mounted within the housing 122, the switch 105 which stops the motor 21 and the movement of the table. Mechanism for operating the switch 105 includes a block 130 pivotally mounted within housing 122 at its lower right-hand corner, viewing the block as in Fig. 5, so that the measuring rod 124 will engage the upper part of the right-hand side of the block when moved inwardly and cause the block to move counterclockwise about its pivot. The lower left-hand corner of block 130 is in engagement with the top of a vertical plunger 131 of dial indicator 129 and the counterclockwise movement causes the lower left-hand corner of the block to move the plunger 131 downwardly. The plunger 131 extends through the dial indicator and engages one end of a horizontal lever 132 pivoted between its ends within housing 122. The other end of the pivoted lever operates the switch 105 mounted above the lever when the downward movement of plunger 131 causes it to move upwardly. In addition to moving the right-hand end of lever 132 upwardly to operate switch 105 the plunger 131 also causes an indication on the face of the dial indicator to show the accuracy of the final positioning of the table with respect to the desired position. The left-hand end of lever 132 is preferably spring biased upwardly by a spring 133 interposed between the lever and the bottom of the housing 122.

If the table is moving rearwardly, one of the push rods 120 will engage the measuring rod 123 moving the measuring rod inwardly to break the rapid traverse circuit and finally stop the table in a manner similar to that just described for the operation of push rod 121. The measuring rod 123 is adapted to be moved inwardly to engage a block 134 pivotally mounted in a manner similar to block 130 so that the measuring rod will move it clockwise against the top of the plunger 131 to move the plunger downwardly and operate switch 105 to stop the table movement. As hereinbefore described the downward movement of plunger 131 also causes an indication to appear on the dial indicator as to the final positioning of the table. The blocks 130, 134 are spring biased for return movement by a compression spring 135 supported between the blocks 130, 134.

The measuring rods 123, 124 are adapted to be manually actuated by levers 136, 137 respectively. One end of each of the levers 136, 137 is received in an aperture 138 in the respective rods and the other end is fixed to a shaft 139 journaled in the sides of housing 122 and adapted to be rotated manually by a handle 140 outside the housing. Rotation of the shafts causes the levers 136, 137 to move the measuring rods 123, 124 axially to actuate the switches.

The automatic index switches 105, 107' and 107 are of such construction that the opening of the contacts can be accurately controlled. The particular switches shown are known as "micro" switches. The accuracy with which the table stops at any predetermined place is indicated on the dial indicator 129. The housing 122 is ordinarily closed by a removable cover 141 provided with an opening through which the dial indicator 129 can be reached and observed.

If the table has been previously stopped at a particular position by the actuation of the automatic index forward feed limit switch 105, by a push rod of a particular turret, the dial indicator will have a particular reading thereon. To move the table forward a predetermined distance from this position, for example, six inches, with the present construction it is only necessary to rotate the member 128 of the particular turret to move a rod which is shorter than the push rod which stopped the table at the particular position by a suitable length, in this case six inches, in line with the push rod and manually initiate the forward rapid traverse drive for the table, which is accomplished in a manner hereinafter described. The table will then move at a rapid traverse rate until the automatic index rapid traverse forward switch 107 or 107' is opened, deenergizing the solenoid 86, whereupon the table will continue to move at the feed rate until the automatic index feed limit switch 105 is opened. When the switch 105 opens, the table stops and the accuracy with which the table has moved the desired distance can be checked on the dial indicator 129. If the deflection of the dial indicator is the same as the reading on the indicator before the table was moved from its previous position, it will be well understood by those skilled in the art that the distance moved will be the six inches desired. If the deflection is different, the amount that the table is off the desired position can be easily determined by subtracting the reading from that of the reading of the previous position. With the construction shown the table can be repeatedly stopped within a fraction of a thousandth of an inch of the desired position.

The spindle head C may be positioned in a manner similar to the table if so desired by providing means similar to the means for positioning the table F. The details of such an arrangement are not shown or described inasmuch as they will fall within the scope of one skilled in the art in view of the description set out in the specification with reference to the control of the table. The machine illustrated, however, is adapted for automatically positioning the spindle head when the desired position is approached in an upward direction.

The upper and lower limits of movement of the spindle head C are controlled by two normally closed limit switches 143 and 143a fixed to the spindle head C and switches 105′ and 107″ secured to the spindle head column. The limit switches 143, 143a, 105′, and 107″ are not shown on the machine but their location in the electrical circuit will be hereinafter referred to. The operation and function of the limit switches 105′ and 107″ are the same as the switches 105, 107, and 107′ and will not be described in detail again. The operation and construction for positioning one way is set out in detail in the aforesaid patent and suffice it to say that as the spindle head is moved in an upward direction the switch 107″ is opened changing the speed of movement of the head from rapid traverse to feed. Further movement of the spindle head opens the spindle head automatic index feed limit switch 105′ stopping the spindle head. The accuracy with which the spindle head stops is indicated on a dial indicator similar to indicator 129.

The saddle right limit switch 145 and the saddle left limit switch 146 (not shown on the machine) are located underneath the rear of the saddle on the left and right-hand sides, respectively, are adapted to be opened upon engagement with stops located on the backrest column and on the bed of the machine, and limit the travel of the saddle towards the right and left, respectively, and the backrest column towards the left.

The spindle 19 is adapted to be rotated at various rates of speed by the main driving reversible motor 23 through the medium of a vertical shaft 150, the lower end of which is rotatably supported in the base A while the upper end is supported in the head column B; and back gears, designated generally by the reference character R; located in the spindle head C. The particular mechanism for driving shaft 150 forms no part of the present invention per se and will not be illustrated and described herein in detail. Suffice it to say that the mechanism is similar to that disclosed in the aforesaid patent to which reference is made for a detailed description thereof.

The driven shaft 160 of the back gears R is rotatably supported in the spindle head and is connected to the upper end of the vertical shaft 150 by a bevel gear 161 carried by the spindle head and splined to the shaft 150. The bevel gear 161 meshes with a bevel gear 162 fixed to the left-hand end of the shaft 160. The spindle 19 is slidably keyed within a spindle quill 163 rotatably supported by suitable bearings in the spindle head C, which spindle quill has a gear cluster comprising the gears 164 and 165 fixed thereto. The gears 164 and 165 are adapted to be selectively engaged by gears 166 and 167, respectively, of a gear cluster splined to the shaft 160. A high speed drive is obtainable through the medium of a V-belt final drive 168 when the gear 167 is shifted into engagement with a gear 169 fixed to a short shaft 170 journaled in the spindle head, which shaft carries the driving pulley of the V-belt drive 168. The gear cluster comprising the gears 166 and 167 is adapted to be shifted along the shaft 160 by suitable hand operated means, not shown.

The spindle 19 is adapted to be fed or rapid traversed in either direction by a lead screw 172 rotatably supported in the spindle head extension and having threaded engagement with a two-piece nut 173 located within the feed slide 174 adjacent to the left-hand end of the spindle 19 and connected thereto in a suitable manner. The lead screw 172 is adapted to be rotated in either direction and at different speeds from the spindle quill 163 through the medium of spur gears 175 and 176, the former of which is fixed to the left-hand end of the spindle quill while the latter is fixed to the right-hand end of a shaft 177 journaled in the spindle head and which forms the driving shaft of a feed speed change transmission, designated generally by the reference character S, housed within a suitable gear box in the spindle head. The gear 178 which forms the output element of the feed change transmission S is operatively connected to a horizontal shaft 179 journaled in the spindle head through the medium of a gear 180 which forms the low speed element of an overrunning clutch transmission T similar to the transmission P previously described. The shaft 179 is adapted to be selectively rotated at a high rate of speed in either direction by the reversible rapid transverse motor 24, which motor is operatively connected to the high speed element 181 of the overrunning clutch transmission T.

The shaft 179 is adapted to be operatively connected to a horizontal shaft 182 journaled in the spindle head and extending substantially the length thereof through the medium of gears 183 and 184, the former of which is in mesh with a gear 185 journaled on the shaft 182 and the latter with a gear 186 which in turn meshes with a gear 187 also journaled on the shaft 182. The gear 186 is journaled on a jack shaft 188 and the gear 187 rotates in a direction opposite to the direction of rotation of the gear 185. The gears 185 and 187 are adapted to be selectively connected to the shaft 182 by a shiftable clutch element 189 splined on the shaft 182 between the gears 185 and 187, opposite ends of which clutch element are provided with clutch teeth adapted to cooperate with similar clutch teeth formed on the adjacent sides of the hub of the gears. The clutch element 189 is normally maintained in an intermediate or neutral position by a pair of springs 190 and 191 but is adapted to be shifted towards the left to drive the shaft 182 from the gear 185 or towards the right to connect the gear 187 with the shaft 182 by electric solenoids 192 and 193, respectively.

The armature of the solenoid 192 is connected to a slidable member 194 provided with an inclined cam slot 195 within which a roller carried by a longitudinally slidable rod 196 engages. The armature of the solenoid 193 is connected to the bar 196 in a manner similar to that in which the armature of the solenoid 192 is connected thereto, except for the fact that the cam slot 197 in the member 198 corresponding to the member 194 is inclined in the opposite direction to the slot 195. The lower ends of the cam slots are widened so that the operation of one of the members 194 and 198 will not be interfered with by the other. The slidable member 196 has a clutch yoke fixed to the right-hand end thereof which engages in a groove formed in the shiftable clutch member 189. The bar 196 is normally held in such a position that the clutch element 189 is in neutral position by the springs 190 and 191 which are located in a cut-out portion of the bar and engage opposite sides of a stationary stop fixed to the frame of the machine.

The left-hand end of the shaft 182 is connected to a gear 199 journaled thereon through the medium of an automatic release overload clutch 200. The gear 199 constitutes the driving gear of change gears, designated generally by the reference character U, the driven gear 201 of which is fixed to the end of the lead screw 172.

Adjacent to its right-hand end, the shaft 182 is operatively connected to a spindle feed hand wheel 202, a crank 203 and fixed and adjustable dials, etc., as is known in the art. The mechanism shown per se forms no part of the present invention, and suffice it to say that the machine includes two spindle limit switches 204 and 205 shown in the circuit diagram adapted to be opened by an adjustable trip 206. The switches 204 and 205 are secured to the rear side of the front of the spindle head and the construction is such that the spindle feed can be automatically stopped at any desired point by setting an adjustable dial which carries the trip 206.

The backrest block G is adapted to be clamped to and unclamped from the ways of the column D by the electric motor 25 carried thereby. The circuit to the motor 25 is controlled by a double throw clamp switch 230, not shown on the machine, operatively connected to the lever, not shown, which operates the spindle head clamp and a limit switch 232, not shown, on the machine in such a manner that when the lever is in a position to clamp the spindle head C to the column B the normally open circuit therethrough is closed, and vice versa. The control for the motor 25 is also interlocked with the main control in such a manner that the solenoid 72 cannot be actuated to connect the lead screws 18 and 20 which raise and lower the spindle head and backrest block, respectively, with the feed rapid traverse motor 21 while the spindle head and backrest block are clamped to the columns B and D, respectively. The details of construction of the spindle head clamp and lever are shown in detail in the aforesaid patent.

The backrest column D may be moved along the horizontal ways 12 and 13 of the bed A either manually or by a motor 26, not shown on the machine, the operation of which motor is adapted to be controlled by two normally open push button switches 237 and 238 located on the front side of the backrest column D underneath a manual lever 239, adapted to clamp the backrest column to the ways 12 and 13 in any adjusted position. The construction is such that the push button switches 237 and 238 cannot be operated unless the lever 239 is in a position to unclamp the backrest column from the ways.

In operation, after the desired feeds have been selected, the remaining operations of the machine are controlled from the electrical control station H previously referred to. The various selecting switches, push button switches, etc. of the control station H are so arranged that their position corresponds to the direction of movement initiated or controlled thereby.

The electrical control station H has twenty-one push buttons and four selecting switches. The feed push buttons for the head, saddle, and table are arranged in groups and each group has two continuous feed push buttons and two "inch" push buttons. In the center of each group is a selecting switch which, when turned on, makes the push buttons in that particular group operative and cuts out through relays all other groups of feed buttons and selecting switches. In the machine shown, the spindle head continuous feed and "inch" feed push buttons are designated by the reference characters 240 and 241, and 242 and 243, respectively. These buttons, together with the selecting switch 244 and the indicating light 245 associated therewith, are grouped together. The saddle continuous feed and "inch" feed buttons 246 and 247, and 248 and 249, and the selecting switch 250 and indicating light 251 associated therewith are grouped together adjacent to the lower end of the front panel of the control station H. The table continuous feed and "inch" feed buttons 252 and 253, and 254 and 255, respectively, and the selecting switch 256 and the indicating light 257 associated therewith are located adjacent to the lower end of the right-hand side panel of the electrical control station. The particular arrangement of the push buttons and switches per se forms no part of the present invention and reference is hereby made to the aforestid patent for the details of the arrangement and operation of the button and switches.

The selecting switches 244, 250 and 256, besides separating electrically the particular unit selected from the other units, energize the solenoids 72, 35 and 45, respectively, connecting the particular unit selected to the feed and rapid traverse motor 21, thus selecting the unit to be moved by power. The respective solenoid will remain energized so long as the selecting switch associated therewith is turned on except during the time than an "inch" or "jog" feed push button switch 258, hereinafter referred to, located on the bed A is depressed. All the controls located on the pendant control station H are rendered inoperative during the time jog push button switch 258 is depressed. After the push button switch 258 has been released, the selection remains as it was prior to pushing the switch, but spindle rotation and any continuous feed which may have been operating is no longer in operation, and if it is desired to continue the previous feed, it must again be started by depressing the particular feed push button in question. To aid the springs 38, 51 and 74 in disengaging the respective clutches, one of the idle solenoids is momentarily energized, in a manner hereinafter described, when the selecting switch associated therewith is turned "off" or job push button switch 258 depressed, thus pulling the clutch into a neutral position.

A single push button switch 260 is employed for controlling the rapid traverse movements of the head, saddle, and table. This push button switch is located on the front panel of the pendant control station and, upon being depressed, closes the circuit to the solenoid 86 through relays in a manner hereinafter referred to, connecting the shaft 29 to the motor 21 through the friction clutch Q, etc. The rapid traverse is not effected unless the feed for the particular element or unit that it is desired to rapid traverse is in operation, and, when initiated the rapid traverse will be in the direction of the feed movement. When desired all feeds including the spindle feed can be stopped by depressing a stop all feeds push button switch. All feeds and the spindle rotation can be stopped by depressing the stop all feeds and spindle rotation push button switch 268 projecting from the bottom of the pendant control.

The fourth selecting switch 262 of the pendant control station H is the spindle feed directional switch. When this switch is turned to the right, the spindle feed, when operated, will be to the right, and when turned to the left, the direction of feed will be to the left. The spindle feed is initiated by a spindle feed push button switch 263 located adjacent the selecting switch 262, both of which switches are located adjacent to the upper end of the front panel of the pendant control station H.

The two push buttons 264 and 265 for controlling the rapid traverse motor 24 are so mounted in the front panel of the pendant control station H that when the right-hand button 264 is depressed, the spindle will be rapid-traversed to the right, and when the left-hand button 265 is depressed, the spindle will be rapid-traversed to the left. To make the spindle rapid traverse push buttons operative, however, the spindle feed selecting switch 262 must be in one of its "on" positions. The rapid traverse push buttons 264 and 265 always move the spindle in the aforesaid directions, that is, the button on the right always moves the spindle to the right and the button on the left always moves the spindle to the left irrespective of the direction of spindle feed selected by the spindle feed direction selecting switch 262. This is accomplished by having the spindle feed solenoid relays control the direction of rotation of the spindle rapid traverse motor 24.

Continuous rotation of the spindle 19 is controlled by three push button switches 266, 267 and 269. The first two button switches 266 and 267 cause the spindle to rotate in opposite directions, down in front and up in front, respectively. The third push button switch 269 "jogs" the spindle down in front. Depressing the push button switch 268 stops both motors 21 and 23. The jog push button 258 previously referred to jogs both the feed and rapid traverse motor 21 and the main motor 23. When the push button switch 258 is depressed slightly, all feeds are thrown out and the rotation of all motors is stopped. When depressed further, both motors 21 and 23 start and continue to run as long as the button is held in its extreme depressed position.

Figs. 7–10 are wiring diagrams of the electrical hook-up of the machine. Referring to these figures, it will be seen that all the push button switches employed, with the exception of the push button switches 237, 238, 260, 261, 264, 265 and 268 are double-throw switches having two or more sets of contacts, one or more sets normally closed and the other set or sets normally open. When the spindle forward push button switch 266 is depressed, a circuit is completed from the line L–1 through normally closed upper contacts of the jog push button switch 258, wire 271, normally closed contacts of the spindle stop push button switch 268, wire 272, normally closed contacts of the spindle jog push button switch 269, wire 273, normally closed contacts of the spindle forward push button switch 267, wire 274, normally open contacts of the push button switch 266, wire 275, operating solenoid 276 of relay 277, wire 278, and overload contacts 279 on motor control panel 280 which controls the motor 23, to line L–2.

Energization of the solenoid 276 closes the normally open contacts 282 and 283 of relay 277, the former of which completes a circuit from the line L–1 through job push button switch 258, wire 271, spindle stop push button switch 268, wire 272, jog push button switch 269, wire 273, spindle forward push button switch 267, wire 274, contacts 282 of relay 277, wire 284, operating solenoid 285 of motor control panel 280, wire 278, and overload contacts 279 to L–2, thus energizing the operating solenoid 285 of motor control panel 280, closing the main contacts 286, 287, and 288 connecting the motor 23 to the main line L–1, L–2, and L–3, causing the motor to rotate in a direction to rotate the spindle 19 down in front, commonly referred to as forward. The second set of contacts 283 of relay 277 complete a holding-in circuit for the solenoid 276 of the relay 277 through the normally closed contacts of the spindle reverse push button 267, wire 274, contacts 283, wire 275, etc., which maintains the relay closed after the push button switch 266 has been released. The motor 23 continues to rotate until the solenoid 285 of the motor control panel 280 is deenergized, which may be accomplished by slightly depressing either of the job push button switches 258 or 269, or the spindle stop push button switch 268 on the pendant control.

To rotate the main motor 23 and in turn the spindle 19 in the reverse direction, the spindle reverse push button switch 267 is depressed, closing the normally open contacts thereof and completing a circuit from the line L–1 through the normally closed contacts of the jog push button switch 258, wire 271, stop push button switch 268, wire 272, jog push button switch 269, wire 273, spindle forward push button switch 266, wire 289, normally open contacts of spindle reverse push button switch 267, wire 290, operating solenoid 291 of relay 292, wire 278, and overload contacts 279 to L–2. Energization of the operating solenoid 291 of relay 292 closes the normally open contacts 293, 294, 295, and 296, and opens the normally closed contacts 297 and 298. The closing of the normally open contacts 293 of relay 292 completes a circuit from the line L–1 through jog push button switch 258, wire 271, stop push button switch 268, wire 272, jog push button switch 269, wire 273, spindle forward push button switch 266, wire 289, contacts 293, wire 299, operating solenoid 300 of motor control panel 280, wire 278, and overload contacts 279 to L–2. Energization of the operating solenoid 300 of motor control panel 280 closes the main contacts 301, 302, and 303 thereof, connecting the motor 23 to the line, causing it to rotate in a direction to rotate the spindle up in front, commonly referred to as reverse. The motor 23 continues to rotate the spindle in the reverse direction until the operating solenoid 300 of the motor control panel 280 is deenergized in a manner previously referred to.

The spindle may be jogged in a forward direction by depressing the spindle jog push button switch 269 to close the normally open contacts thereof and complete a circuit from the line L–1 through jog push button switch 258, wire 271, spindle stop push button switch 268, wire 272, jog push button switch 269, wire 284, operating solenoid 285 of motor control panel 280, wire 278, and overload contacts 279 to line L–2. Energization of the operating solenoid 285 of motor control panel 280 closes the main contacts 286, 287, and 288 connecting the motor 23 to the line in such a manner that the motor rotates the spindle in a forward direction. The motor continues to operate as long as the jog push button switch 269 is depressed sufficiently to hold the normally open contacts thereof closed. The spindle rotation push button switches 266, 267 and the jog push button switch 269 are so interlocked that when the spindle is rotating continuously in either direction and it is desired to reverse the direction of rotation of the spindle, it is merely necessary to depress the desired push button switch.

The motor 23 can also be jogged by depressing the jog push button switch 258 located on the base of the machine far enough to close the normally open contacts thereof. The closing of these contacts establishes a circuit from the line L–1 through spindle and feed motor jog push button switch 258, wire 304, and operating solenoid 305 of relay 306 to L–2. The energization of the operating solenoid 305 of relay 306 closes the normally open contacts 308, 309 and 310 thereof, the former of which closes a circuit from the line L–1 through jog push button switch 258, wire 304, contacts 308, wire 284, operating solenoid 285 of the motor control panel 280, wire 278, and overload contacts 279 to line L–2. Energization of the operating solenoid 285 of motor control panel 280 operates the main contacts 286, 287 and 288 thereof to connect the motor 23 to the line to rotate the spindle forward. The closing of contacts 309 and 310 of relay 306 establishes circuits hereinafter more specifically referred to, which among other things, causes the feed and rapid traverse motor 21 to rotate.

The motor 23 is so constructed and wired that when the rotation thereof is stopped by depressing either of the push button switches 266 or 267, the motor is instantaneously brought to rest by being momentarily connected to the line in such a manner that it tends to rotate in the opposite direction. This is referred to as "plugging" and is accomplished in the present instance by a switch 312, comprising two sets of contacts 313 and 314 adapted to be selectively closed while the rotor of the motor is rotating depending upon the direction of rotation. In the present instance when the motor is rotating the spindle 19 forward, the contacts 313 are closed, whereas when the motor is rotating in reverse, the contacts 314 are closed. The contacts 313 of the switch 312 are in series circuit with a normally closed set of contacts 315 adapted to be opened upon energization of the operating solenoid 285 of the motor control panel 280. When the rotation of the motor 23 is stopped by depressing either of the push button switches 266 or 267, with the motor rotating in the forward direction, the operating solenoid 285 is deenergized and the motor disconnected from the line. Deenergization of the operating solenoid 285 allows the contacts 315 to close which completes a circuit from the line L–1 through jog push button switch 258, wire 271, stop all feeds and spindle rotation push button switch 268, wire 272, jog push button switch 269, wire 273, contacts 313 of switch 312, wire 311, contacts 315, wire 299, operating solenoid 300 of motor control panel 280, etc., to line 1—2 so long as the motor 23 continues to rotate in a forward direction. Energization of the operating solenoid 300 of the motor panel 280 closes the main contacts 301, 302 and 303 which tend to rotate the motor in the opposite direction.

The contacts 314 of switch 312 are in series circuit with a normally closed set of contacts 316 adapted to be opened upon energization of the operating solenoid 300 of the motor control panel 280. When either of the push button switches 266 or 267 is depressed with the motor rotating in the reverse direction, the operating solenoid 300 is deenergized and the motor disconnected from the line. Deenergization of the operating solenoid 300 allows the contacts 316 to close, establishing a circuit from the wire 273 through the contacts 314 of switch 312, wire 141, contacts 316, wire 284, operating solenoid 285, etc. of motor control panel 280 to line L–2 so long as the motor 23 continues to rotate in a reverse direction. Energization of the operating solenoid 285 of the motor control panel 280 closes the main contacts 286, 287 and 288, which tend to rotate the motor in the opposite direction. When the motor 23 is stopped by depressing either of the push button switches 258, 269 or 268, irrespective of the direction of rotation, the motor coasts or, in other words, the plugging is not effected until the push button is released, since these switches are in series with both sets of contacts of the switch 312.

Figure 7:
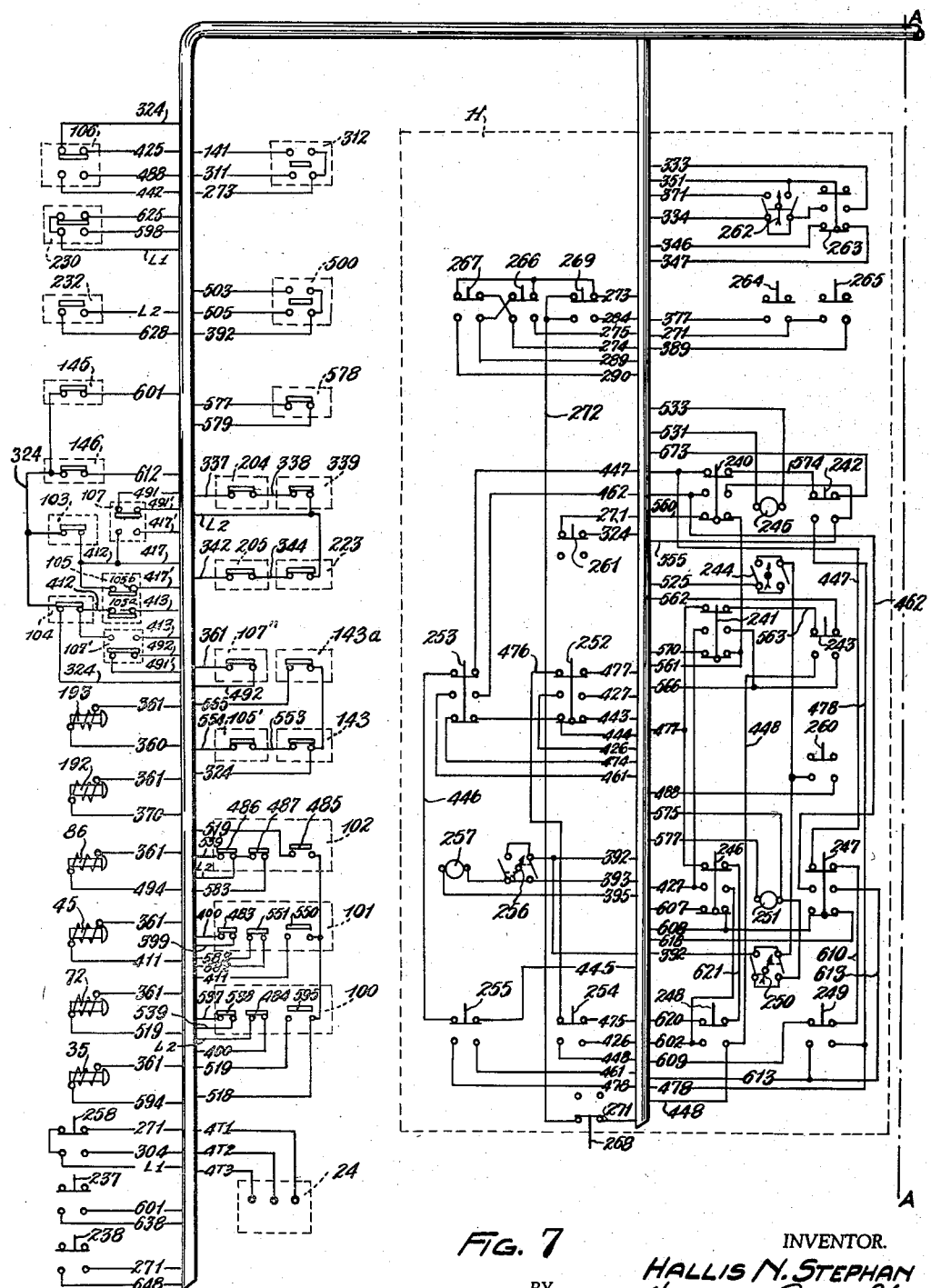
Figs. 7, 8, 9 and 10 are wiring diagrams of the electrical control circuits for controlling the operation of the machine.
Figure 8:
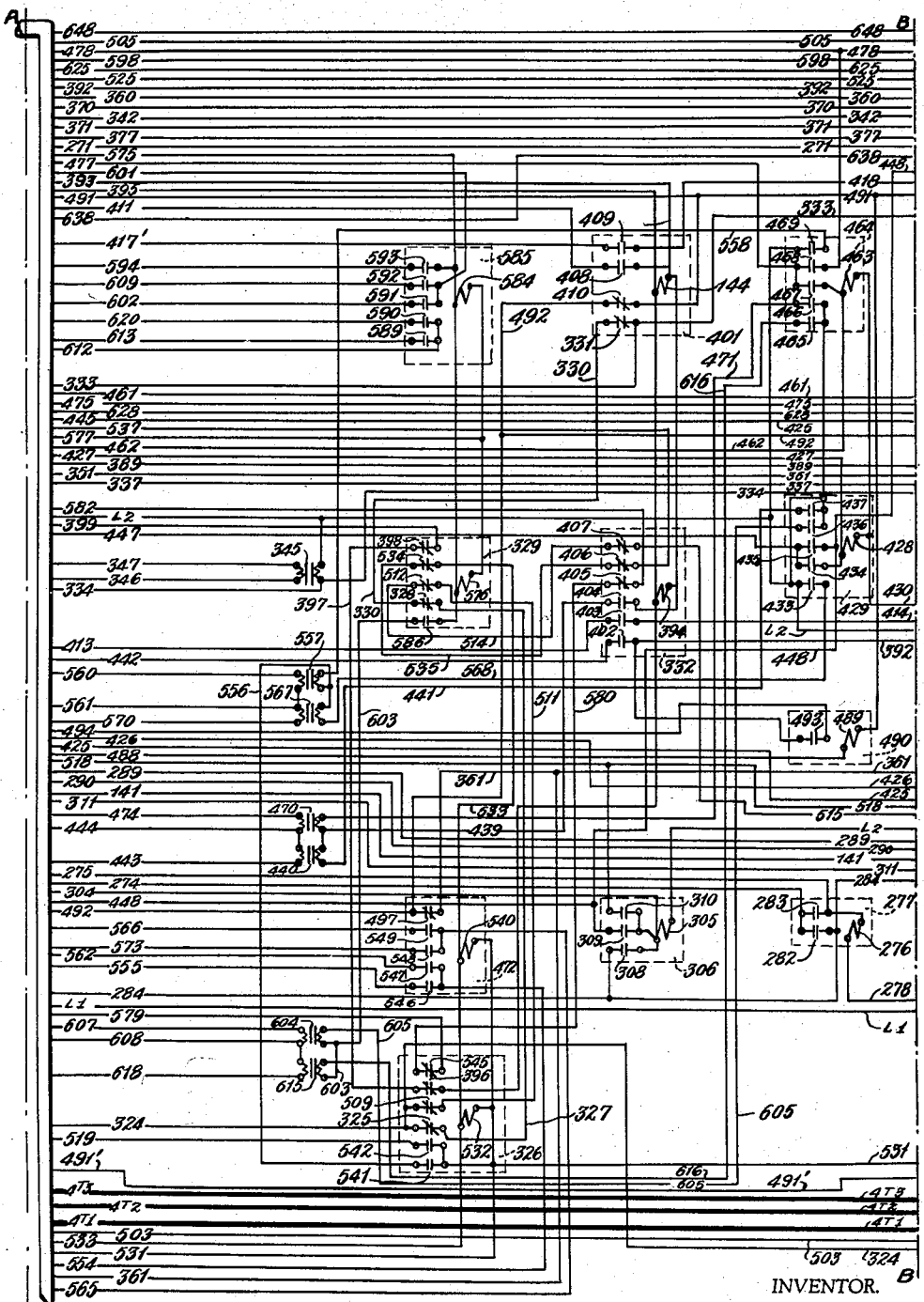
Figure 9:
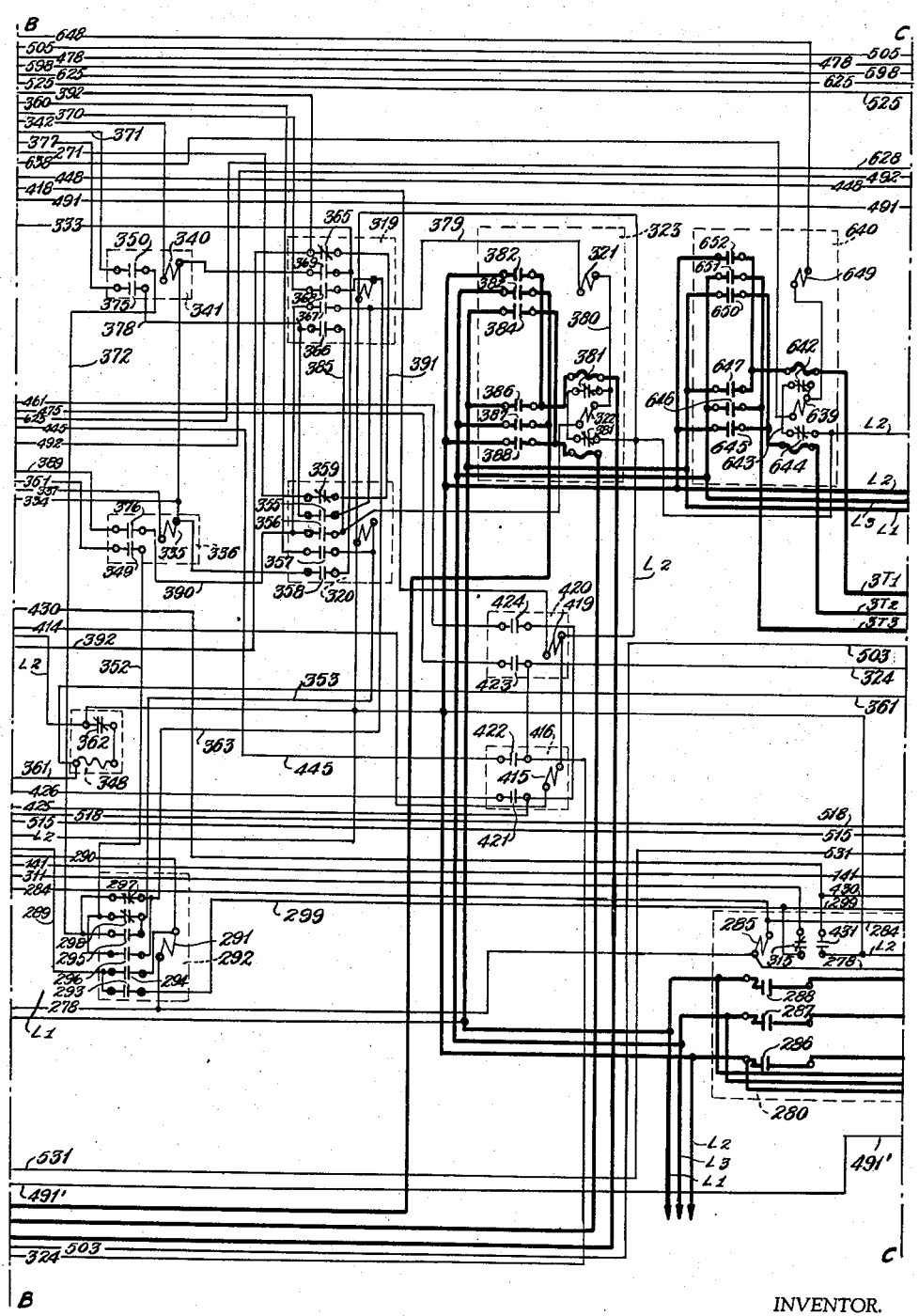
Figure 10:
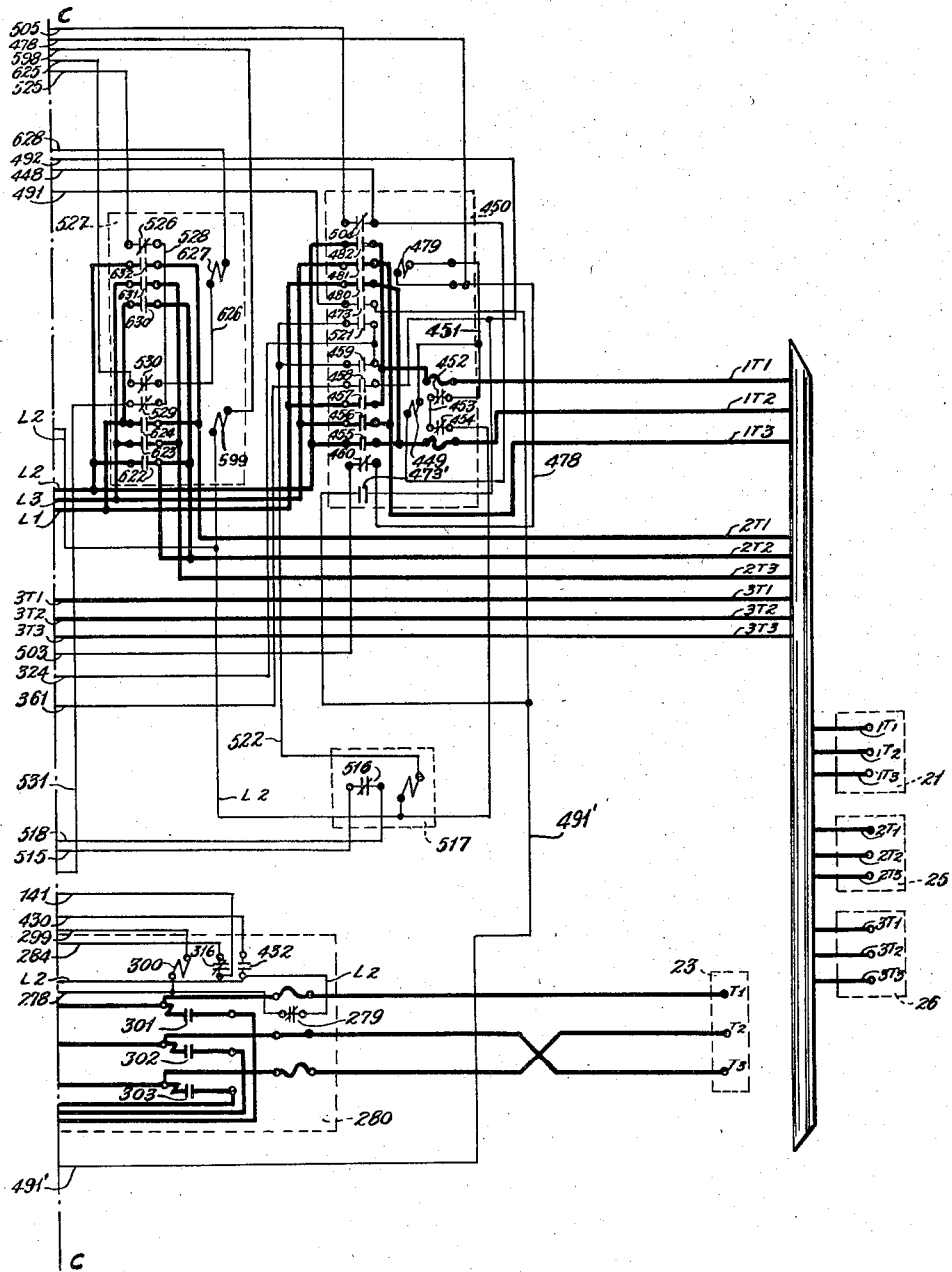

The spindle feed directional and the spindle rapid traverse controls are so designed that when the directional switch 262 is turned to the left as viewed in Fig. 7, or in other words, when the contacts 317 thereof are closed, the spindle feed is to the left regardless of the direction of rotation of the spindle 19. When the directional switch 262 is turned to the right, that is, to a position to close the contacts 318, the spindle feed is to the right, likewise, regardless of the direction of rotation of the spindle 19. This is accomplished through the medium of the contacts 295, 296, 297 and 298 of the relay 292, the former two of which contacts are normally open, while the latter two are normally closed. The operating solenoid 291 of the relay 292, as previously explained, is energized when the spindle is rotating in reverse and when energized causes a transposition of the control wires to relays 319 and 320, which in turn control the energization of the clutch operating solenoids 192 and 193, respectively. The spindle rapid traverse push button switches 264 and 265 always rapid traverse the spindle in the same direction regardless of the position of the directional switch 262, or the direction of rotation of the spindle 19. This is accomplished by a transposition of the control wires by the relays 319 and 320 to the operating solenoids 321 and 322 of the motor control panel 323 for the spindle rapid traverse motor 24. However, the switch 262 must be in one or the other of its two "on" positions before the rapid traverse push button switches 264 or 265 are operative.

With the foregoing in mind, the spindle 19 may be fed towards the left, or in a forward direction, by first turning the feed directional selecting switch 262 to its left-hand "on" position, and subsequently depressing the spindle feed push button 263. Turning the directional selecting switch to the left, closes the contacts 317 thereof, and upon depressing the spindle feed push button switch 263 a circuit is established from the line L–1, through jog push button switch 258, wire 271, stop all feeds push button switch 261, wire 324, normally closed contacts 325 of relay 326, wire 327, normally closed contacts 328 of relay 329, wire 330, normally closed contacts 331 of relay 401, wire 333, contacts of spindle start push button 263, wire 334, operating solenoid 335 of relay 336, wire 337, adjustable dial limit switch 204, wire 338, and limit switch 339 on the spindle head to L–2. At the same time a circuit is completed from wire 334 through the operating solenoid 340 of relay 341, wire 342, adjustable dial limit switch 205 on the spindle head, wire 344, and limit switch 223 to L–2, which circuit is connected in parallel with the circuit through the operating solenoid 335 of relay 336 and the limit switches 204 and 339. Simultaneously, a third circuit is completed from the wire 334 through transformer 345 to the line L–2. The secondary of the transformer 345 is connected by the wires 346 and 347 to the indicating light located in the spindle feed start push button switch 263. While the spindle 19 is being fed the light is energized regardless of the direction of feed.

Energization of the operating solenoids 335 and 340 of the relays 336 and 341, respectively, closes the normally open contacts 349 of relay 336 and the normally open contacts 350 of relay 341 in series circuit with the contacts 317 and 318, respectively, of the directional selecting switch 262. The closing of the normally open contacts 350 has no effect on the circuit, since these contacts are in series with contacts 318 of the directional selecting switch 262 which are now open.

The closing of the normally open contacts 349 of the relay 336 establishes a circuit from the wire 334 through contacts 317, wire 351, contacts 349, wire 352, contacts 298 of relay 292, wire 353, and operating solenoid 354 of relay 320 to L–2. Energization of the operating solenoid 354 of relay 320 closes the normally open contacts 355, 356, 357 and 358 and opens the normally closed contacts 359 thereof.

The closing of contacts 357 of relay 320 completes a circuit from the wire 353, through the contacts 357, wire 360, solenoid 193, wire 561, and normally closed solenoid overload contacts 362 to L–2. Energization of the solenoid 193 shifts the movable clutch element 189 to the right, as viewed in Fig. 7, that is, in a direction to feed the spindle to the left when the spindle is rotating in the forward direction. The closing of the normally open contacts 358 of relay 320 establishes a holding circuit for the relays 336 and 341 from the wire 333, through the contacts 358, wire 334, operating solenoids 335 and 340 of relays 336 and 341, respectively, and the limit switches 204, 339 and 205, 223, respectively. The holding circuit just referred to continues the feed after the spindle feed push button switch 263 is released. The spindle continues to feed forward until the holding circuit for relay 336 is broken either by the opening of one of the limit switches 204 or 339, by the directional selecting switch 262 being returned to its "off" position, or by the jog push button switch 258 or the stop all feeds push button switch 261 being depressed. When the holding circuit for the relay 336 is broken, the operating circuit for the solenoid 193 is in turn broken and the movable clutch element 189 allowed to return to its neutral position under the action of the spring 191.

Assuming that the spindle is rotating in the forward direction and that the feed direction selecting switch 262 is in its left-hand "on" position with the contacts 317 thereof closed, when the spindle feed start push button switch 263 is depressed, the spindle will feed towards the left, even though the direction of rotation of the spindle is reversed. This is accomplished by the relay 292, the operating solenoid 291 of which is energized while the spindle is rotating in the reverse direction, as previously explained. Energization of the operating coil 291 of relay 292 opens the normally closed contacts 297 and 298 and closes the normally open contacts 295 and 296 thereof, connecting the wire 352 to wire 363 instead of to wire 353, as in the case when the spindle is rotating forwardly. When the spindle feed start push button switch 263 is depressed this establishes a circuit in addition to the circuits established through the relays 336 and 341, from the wire 334 through contacts 317 of direction selecting switch 262, wire 351, contacts 349 of relay 336, wire 352, contacts 296 of relay 292, wire 363, and operating solenoid 364 of relay 319 to line L-2. Energization of the operating solenoid 364 of relay 319 opens the normally closed contact 365 and closes the normally open contacts 366, 367, 368 and 369 thereof. The closing of contacts 368 of relay 319 establishes a circuit from the wire 363, through contacts 368, wire 370, solenoid 192, and wire 361, contacts 362 of solenoid overload relay 348 to L-2, energizing the solenoid 192 shifting the movable clutch element 189 towards the left, as viewed in Fig. 7, thus operatively connecting the gear 185 with the shaft 182. This would ordinarily rotate the lead screw 172 in the reverse direction, but since the direction of rotation of the spindle 19 has been reversed, the feed is in or to the left. The closing of contacts 369 establishes a holding circuit for relay 336 from wire 333 through contacts 369 to wire 334, thus maintaining relay 336 energized and also maintaining the solenoid 192 and the indicating transformer 345 energized. The spindle continues to feed towards the left as long as it is rotated until the holding circuit just mentioned is broken by either depressing the stop all feeds push button switch 261 or the jog push button switch 258 on the base of the machine, by returning the direction selecting switch 262 to "off" position, or by the opening of either of the limit switches 264 or 339. When the holding circuit for the relay 336 is broken, the operating circuit for the relay 319 and the solenoid 192 is in turn broken and the movable clutch element 189 allowed to return to its neutral position under the action of the spring 190.

Assuming now that it is desired to feed the spindle in the reverse direction or towards the right, the spindle feed selecting switch 262 is turned to its right "on" position closing the contacts 318 thereof. The spindle feed start push button switch 263 when depressed, establishes a circuit from the wire 333 of spindle start push button 263, wire 334, operating solenoid 335 of relay 336, wire 337, limit switch 204, wire 338, and limit switch 339 to L-2. At the same time a circuit is completed through the operating solenoid 340 of relay 341, wire 342 and limit switch 205, wire 344 and limit switch 223 to L-2. Simultaneously, a third circuit is completed from the wire 334, through the transformer 345 to the line L-2.

As previously explained, energization of the operating solenoids 335 and 340 of the relays 336 and 341, respectively, closes the normally open contacts 349 of relay 336 and the normally open contacts 350 of relay 341 in series circuit with the contacts 317 and 318, respectively, of the direction selecting switch 262. The closing of the normally open contacts 350 establishes a circuit from the wire 334 through contacts 318, wire 371, contacts 350, wire 372, normally closed contacts 297 of relay 292, wire 363, and operating solenoid 364 of relay 319 to L-2. Energization of the operating solenoid 364 of relay 319 closes the normally open contacts 366, 367, 368 and 369 and opens the normally closed contacts 365 thereof. The closing of the normally open contacts 368 of relay 319 completes a circuit from the wire 363, through the contacts 368, wire 370, and solenoid 192, wire 361, contacts 362 of solenoid overload relay 348 to L-2. Energization of the solenoid 192 shifts the movable clutch element 189 to the left, as viewed in Fig. 7, that is, in a direction to feed the spindle to the right when the spindle is rotating forwardly. The closing of the normally open contacts 369 of relay 319 establishes a holding circuit for the relays 336 and 341 from the wire 333, through the contacts 369, wire 334, operating solenoids 335 and 340 and limit switches 204, 339, and 205, 223, respectively. The holding circuit just referred to continues the feed after the spindle feed push button 263 is released. The spindle continues to feed to the right until the holding circuit for relay 341 is broken either by the opening of one of the limit switches 223 or 205, by returning the feed direction selecting switch 262 to "off" position, or by depressing the jog push button switch 258 or the stop all feeds push button switch 261. When the holding circuit for the relay 341 is broken, the operating circuits for the relay 319 and the solenoid 192 are in turn broken and the movable clutch element 189 allowed to return to its neutral position.

Assuming that the direction of rotation of the spindle 19 is reversed, nevertheless the direction of feed will be to the right when the spindle feed start push button switch 263 is depressed, so long as the feed direction selecting switch 262 is in its right-hand "on" position with the contacts 318 thereof closed. This is accomplished by the relay 292 in a manner similar to that referred to with reference to the feed towards the left. The operating solenoid 291 of the relay 292 is energized when the spindle is rotating in reverse direction, as previously explained, which opens the normally closed contacts 297 and closes the normally open contacts 295 connecting the wire 372 to wire 353 instead of wire 363. When the spindle feed start push button 263 is depressed, in addition to the circuits established through the relays 336 and 341, a circuit is established from the wire 334 through contacts 318 of direction selecting switch 262, contacts 350 of relay 341, contacts 295 of relay 292, wire 353, and operating solenoid 354 of relay 320 to line L-2. Energization of the operating solenoid 354 of relay 320 opens the normally closed contacts 359 and closes the normally open contacts 357 and 358 thereof. The closing of contacts 357 establishes a circuit from the wire 353, through the contacts 357, wire 360, and solenoid 193, wire 361, contacts 362 of solenoid overload relay 348 to L-2, energizing the solenoid 193 and shifting the movable clutch element 189 towards the right, as viewed in Fig. 7, thus operatively connecting the gear 187 with the shaft 182. This would ordinarily rotate the lead screw 172 in the reverse direction, but since the direction of rotation of the spindle 19 has been reversed, the feed is still to the right. The closing of contacts 358 establishes a holding circuit for relay 341 from wire 333 through contacts 358, wire 334, etc., thus maintaining the operating solenoid 340 of relay 341 energized and also maintaining the solenoid 193 and the indicating transformer 345 energized. The spindle continues to feed towards the right until the holding circuit just mentioned is broken by either depressing the stop push button switch 261 or the jog push button switch 258, by returning the feed direction selecting switch 262 to its "off" position, or by the opening of either of the limit switches 205 or 223. When the holding circuit for the relay 341 is broken, the operating circuits for relay 320 and solenoid 193 are in turn broken and the movable clutch element 189 allowed to return to its neutral position.

*Spindle rapid traverse*

The spindle 19 cannot be rapid traversed in either direction unless the direction selecting switch 262 is in one of its "on" positions and the spindle feed start push button 263 depressed, since the normally open contacts 375 of relay 341 are in series with the normally open contacts of spindle rapid traverse push button 264 and normally open contacts 376 of relay 336 are in series with the normally open contacts of rapid traverse push button switch 265. With the direction selecting switch 262 in either "on" position and the spindle start push button switch 263 having been depressed and released, the spindle can be rapid traversed towards the right by depressing the right-hand spindle rapid traverse push button switch 264 and toward the left by depressing the left-hand spindle rapid traverse push button 265. It is immaterial in which of the "on" positions the direction selecting switch 262 is positioned since either position actuates both relays 336 and 341. The spindle feed start push button must have been closed or depressed in order to make the rapid traverse operative since the rapid traverse push button switches 264 and 265 are in series circuit with normally open contacts of relays 319 and 320 and these relays can only be actuated to close the normally open contacts thereof by depressing the spindle feed start push button 263. After the spindle feed push button switch 263 has been initially closed, holding circuits heretofore referred to maintain the operating solenoids of the particular relay selected by the direction selecting switch 262 energized.

Assuming that the direction selecting switch 262 has been turned to its left-hand "on" position and the contacts 317 thereof closed and that the spindle feed start push button switch 263 has been depressed, the depressing of the right-hand spindle rapid traverse push button switch 264 to rapid traverse the spindle towards the right closes the normally open contacts thereof establishing a circuit from the line L–1 through normally closed contacts of jog push button switch 258, wire 271, spindle rapid traverse push button switch 264, wire 377, normally open contacts 375 of relay 341 which are now closed, wire 378, normally open contacts 355 of relay 320 which are now closed, wire 379, operating solenoid 321 of spindle rapid traverse motor control panel 323, wire 380, and normally closed overload contacts 381 of spindle rapid traverse motor control panel 323 to L–2. This energizes the operating solenoid 321 of rapid traverse motor control panel 323, closing the main contacts 382, 383 and 384, connecting the motor 24 to the line, causing the motor to rotate in a direction to rapid traverse the spindle to the right. Operation of the motor 24 continues until the rapid traverse push button switch 264 is released whereupon the rapid traverse of the spindle stops.

In the event that the spindle feed direction switch 262 is in its right-hand "on" position with the contacts 318 thereof closed, when the spindle rapid traverse push button switch 264 is depressed the spindle will, nevertheless, be rapid traversed towards the right, since in this event the operating solenoid 364 of the relay 319 will be energized rather than the operating solenoid 354 of the relay 320. When the right-hand spindle rapid traverse push button switch 264 is depressed, under these circumstances the circuit is established from the wire 378 through the contacts 366 of relay 319 which contacts are now closed, wire 385, operating solenoid 322 of rapid traverse motor control panel 323, wire 380, and normally closed overload contacts 381 to line L–2. Energization of the operating solenoid 322 of motor control panel 323 closes the main contacts 386, 387, 388 thereof, connecting the motor 24 to the line in such a manner that it rotates in the reverse direction but the direction in which the spindle is rapid traversed remains the same since the energization of the relay 319 instead of the relay 320 has in the interim reversed the position of the movable clutch element 189.

The spindle can be rapid traversed in the reverse direction or to the left in a manner similar to that in which it is rapid traversed towards the right by depressing the left-hand rapid traverse push button switch 265. When this push button switch is depressed with the spindle feed direction switch 262 in its left-hand "on" position with the contacts 317 thereof closed and the other necessary circuits set up by depressing the spindle start push button switch 263, a circuit is established from the wire 271, normally open contacts of push button switch 265, wire 389, normally open contacts 376 of relay 336 which contacts are now closed, wire 390, contacts 356 of relay 320 which contacts are now closed, wire 385, operating solenoid 322 of motor control panel 323, and wire 380, etc., to line L–2. Energization of the operating solenoid 322 of the motor control panel 323 closes the main contacts 386, 387, 388 thereof, causing the motor 24 to rotate in a direction to rapid traverse the spindle to the left.

With the spindle feed direction control switch 262 in the opposite "on" position, that is, with the contacts 318 thereof closed, depressing the left-hand spindle rapid traverse push button switch 265, establishes a circuit from the wire 271, through the normally open contacts of push button switch 265, wire 389, contacts 376 of relay 336, wire 390, contacts 367 of relay 319, wire 379, operating solenoid 321 of motor control panel 323, wire 380, etc., to line L–2. Energization of the operating solenoid 321 of rapid traverse motor control panel 323 closes the main contacts 382, 383 and 384 thereof, causing the motor to rotate in a reverse direction, but since the movable clutch element 189 has been shifted to its opposite position by the opening of relay 320 and the closing of relay 319, the spindle moves toward the left.

*Table control*

To move the table F, the selecting switch 256 is first turned to its "on" position. Assuming that the spindle feed is not operating, in which event contacts 359 and 365 are closed, and that the selecting switches 244 and 250 are "off," a circuit is then established from the line L–1 through jog push button switch 258, wire 271, normally closed contacts 359 of relay 320, wire 391, normally closed contacts 365 of relay 319, wire 392, selecting switch 256, wire 393, operating solenoid 394 of relay 332, wire 395, normally closed contacts 396 of relay 326, wire 397, and normally closed contacts 398 of relay 329, wire 399, normally closed contacts 483 of switch 101, wire 400, normally closed contacts 484 of switch 100 to L–2. In the event that either of the selecting switches 244 or 250 are turned on, or in the event that either of the clutches M or O are engaged for any reason, the contacts 483 and 484 of the switches 101 and 100, respectively, will be open, thus preventing the circuit from closing. Simultaneously, the operating solenoid 144 of relay 401 and the indicating light 257 are energized as they are connected in parallel with the operating solenoid 394 of relay 332. Energization of the operating solenoid 394 of relay 332 closes the normally open contacts 402, 403, and 404 and opens the normally closed contacts 405, 406 and 407 thereof. Energization of the operating solenoid 144 of relay 401 closes the normally open contacts 408 and 409 and opens the normally closed contacts 331 and 410 thereof. The closing of the contacts 408 of relay 401 establishes a circuit from the wire 393 through the contacts 408, wire 411, solenoid 45, wire 361, and contacts 362 of solenoid overload relay 348 to L–2. Energization of the solenoid 45 shifts the movable clutch element 44, engaging the clutch K and connecting the lead screw 40 with the motor 21, and closing the normally open contacts 485 of switch 102 and opening the normally closed contacts 486 and 487. The closing of normally open contacts 403 of relay 332 establishes a circuit from the line L–1 through jog push button switch 258, wire 271, stop all feeds push button switch 261, wire 324, table front limit switch 104, wire 412, contacts 105ᵃ of index stop limit switch 105, wire 413, contacts 403 of relay 332, wire 414, and operating solenoid 415 of table limit relay 416 to L–2. Simultaneously a circuit is established from the wire 324 through the back limit switch 103, wire 417, contacts 105ᵇ of index stop limit switch 105, wire 417′, contacts 409 of relay 332, wire 418, operating solenoid 419 of table limit relay 420 to L–2. Energization of the operating solenoid 415 of table limit relay 416 closes the normally open contacts 421 and 422 thereof. Energization of the operating solenoid 419 of table limit relay 420 closes the normally open contacts 423 and 424 thereof.

The table F can now be moved along the saddle E by depressing either of the "continuous" push buttons 252 and 253, or either of the "inch" push buttons 254 and 255. To feed the table F forward, the front "continuous" push button 252 is depressed, opening the normally closed contacts and closing the normally open contacts thereof. Closing of the normally open contacts establishes a circuit from the line L-1, through jog push button switch 258, wire 271, through the stop all feeds push button switch 261, wire 324, normally closed contacts of switch 106, wire 425, contacts 421 of relay 416, wire 426, normally open contacts of push button switch 252, wire 427, operating solenoid 428 of relay 429, wire 430, and either normally open contacts 431 or 432 of the motor control panel 280, depending upon the direction of rotation of the main driving motor 23, to line L-2. Energization of the operating solenoid 428 of relay 429 closes the normally open contacts 433, 434, 435, 436 and 437 thereof. The closing of contacts 437 of relay 429 closes a circuit from the wire 393 through the contacts 404 of relay 332, wire 439, transformer 440, wire 441, and contacts 437 to L-2, energizing the indicating light located in the push button 252, which indicating light is connected to the secondary of the transformer 440 by the wires 443 and 444.

The closing of contacts 434 of relay 429 establishes a holding circuit for the relay from the line L-1 through jog push button switch 258, wire 271, through the normally closed contacts of stop all feeds push button switch 261, wire 324, contacts 422 of relay 416, wire 445, normally closed contacts of push button switch 255, wire 446, normally closed contacts of continuous back push button switch 253, wire 447, contacts 434, wire 427, operating solenoid 428 of relay 429, wire 430, and contacts 431 or 432 of motor control panel 280 to line L-2. This holding circuit maintains the operating solenoid of the relay 429 energized after the push button switch 252 has been released. The closing of contacts 435 of relay 429 completes a circuit from the wire 447, through the contacts 435, wire 448, operating solenoid 449 of motor control panel 450, wire 451, overload contacts 452 of motor control panel 450, wire 453, and overload contacts 454 of motor control panel 450 to L-2. Energization of the operating solenoid 449 of the motor control panel 450 closes the main contacts 455, 456, and 457 thereof, connecting the feed and rapid traverse motor 21 to the main line in such a manner that the motor rotates in a direction to move the table towards the front. Simultaneously normally open contacts 458 and 459 of motor control panel 450 are closed and normally closed contacts 460 are opened.

The motor 21 continues to rotate in a forward direction as long as the holding circuit for the relay 429 is maintained and so long as the limit switches 104 and 105 remain closed. Upon the opening of either of the limit switches 104 or 105, jog push button switch 258, or stop all feeds push button switch 261, the circuit to the operating solenoid 449 of the motor control panel 450 is broken and the motor 21 disconnected from the line. Deenergizing the operating solenoid 428 of the relay 429 opens the primary circuit to the transformer 440 and extinguishes the light in the table continuous forward push button 252. The table F can be inched forward by depressing the "inch" forward push button switch 254. This closes a circuit from the line L-1, through jog push button switch 258, wire 271, stop all feeds push button 261, wire 324, rapid traverse switch 106, wire 425, contacts 421 of relay 416, wire 426, normally open contacts of push button switch 254, wire 448, operating solenoid 449 of motor control panel 450, etc. Energization of the operating solenoid 449 of the motor control panel 450 closes the main contacts 455, 456 and 457 thereof, causing the motor 21 to rotate in the same direction as previously referred to. The motor continues to rotate so long as the "inch" forward push button switch 254 is depressed.

The table F can be moved back continuously by depressing the back "continuous" push button switch 253. This establishes a circuit from the line L-1, through jog push button switch 258, wire 271, normally closed contacts of stop all feeds push button switch 261, wire 324, rapid traverse switch 106, wire 425, contacts 424 of relay 420, wire 461, normally open contacts of "continuous" back push button switch 253, wire 462, operating solenoid 463 of relay 464, wire 430, and either contacts 431 or 432 of motor control panel 280 to L-2. Energization of the operating solenoid 463 of relay 464 closes the normally open contacts 465, 466, 467, 468, and 469 thereof. The closing of contacts 466 of relay 464 establishes a circuit from the line L-1, through jog push button switch 258, wire 271, normally closed contacts 359 of relay 320, wire 391, normally closed contacts 365 of relay 319, wire 392, selecting switch 256, wire 393, contacts 404 of relay 332, wire 439, transformer 470, wire 471, and contacts 466 to L-2. Energization of transformer 470 energizes the indicating lamp in the "continuous" back push button switch 253, which lamp is connected to the secondary of the transformer 470 by the wires 444 and 474.

The closing of contacts 467 of relay 464 completes a holding circuit therefor from the line L-1, through jog push button switch 258, wire 271, normally closed contacts of stop push button switch 261, wire 324, normally open contacts 423 of relay 420, wire 475, normally closed contacts of "inch" front push button switch 254, wire 476, normally closed contacts of "continuous" front push button switch 252, wire 477, contacts 467, wire 462, operating solenoid 463 of relay 464, wire 430, and contacts 431 or 432 to line L-2. This holding circuit maintains the relay 464 energized after the "continuous" back push button switch 253 has been released. The closing of contacts 468 of relay 464 completes a circuit from wire 477, through contacts 468, wire 478, operating solenoid 479 of motor control panel 450, wire 451, overload contacts 452 of motor control panel 450, wire 453, and overload contacts 454 of motor control panel 450 to L-2. Energization of the operating solenoid 479 of motor control panel 450 closes the contacts 480, 481, and 482 thereof connecting the motor 21 to the line in such a manner that it rotates in a direction to move the table back. The motor continues to operate until the limit switch 103 or index stop limit switch 105 is opened by the table reaching the end of its travel or until the feed stop push button switch 261 is depressed. When the motor is stopped, the holding circuit for relay 464 is broken and the indicating lamp in the continuous back push button 253 is extinguished. Energization of the operating solenoid 479 of motor control panel 450 opens the normally closed contacts 504 and closes the normally open contacts 473 and 521.

The table can be inched back by depressing the "inch" back push button switch 255 closing the normally open contacts thereof. This establishes a circuit from the line L-1, through jog push button switch 258, wire 271, normally closed contacts of push button switch 261, wire 324, switch 106, wire 425, normally open contacts 424 of relay 420, wire 461, normally open contacts of "inch" back push button switch 255, wire 478, operating solenoid 479 of motor control panel 450, etc., to L-2. Energization of the operating solenoid 479 of the motor control panel 450 causes the main contacts 480, 481 and 482 thereof to close, connecting the motor to the line. The motor continues to operate as long as the "inch" push button switch 255 is depressed sufficient to hold the normally open contacts thereof closed.

The spindle 19 must be rotating otherwise the table cannot be moved since the contacts 431 and 432 are only closed when the main motor 23 is rotating in one direction or the other. The table cannot be rapid traversed unless the feed and rapid traverse motor 21 is rotating. With the motors 23 and 21 rotating, the table can be rapid traversed in either direction, depending upon the direction of rotation of the motor 21 by merely depressing the normally open rapid traverse push button switch 260 to close the contacts thereof. This establishes a circuit from the line L-1, through jog push button switch 258, wire 271, normally closed contacts 359 of relay 320, wire 391, normally closed contacts 365 of relay 319, wire 392, rapid traverse push button switch 260, wire 488, and operating solenoid 489 of rapid traverse limit relay 490, wire 491, dial indicator rapid traverse table forward limit switch 107, wire 491', dial indicator rapid traverse table back limit switch 107', wire 492, dial indicator rapid traverse spindle head up limit switch 107", wire 361, contacts 362 of solenoid overload relay 348 to L–2. Energization of the operating solenoid 489 of rapid traverse relay 490 closes the normally open contacts 493 thereof, completing a circuit from the wire 392, through the contacts 493, wire 494, solenoid 86, wire 361, contacts 362 of solenoid overload relay 348 to L–2. Energization of the solenoid 86 engages the normally disengaged friction clutch Q, causing the lead screw 40 to be rotated at a comparatively high rate of speed through the over-running clutch device P. When the rapid traverse push button switch 260 is released, the solenoid 86 is deenergized and the friction clutch Q disengaged, thus stopping the rapid traverse movement.

The dial indicator rapid traverse table forward switch 107 and rapid traverse table back switch 107' are in parallel circuit with normally closed contacts 410 of relay 401. The forward switch 107 is also in parallel with normally open contacts 473 of motor control panel 450, and the rapid traverse table back switch 107' is also in parallel circuit with normally open contacts 473' of motor control panel 450. The dial indicator rapid traverse up spindle head switch 107" is in parallel circuit with normally open contacts 458 of motor control panel 450 and normally closed contacts 497 of relay 472. The contacts 410 shunt out the switches 107 and 107' unless the circuit through the table selecting switch 256 is established, and the contacts 473 shunt out the switch 107 when the solenoid 479 of motor control panel 450 is energized and the motor 21 connected to the line in such a manner that it rotates in a direction to move the table back. The contacts 473' shunt out the switch 107' when the solenoid 449 is energized to move the table in a forward direction. This latter construction allows the table to be moved off the switches 107 and 107' at a rapid traverse rate in the opposite direction. In a similar manner the contacts 497 shunt out the switch 107" unless the circuit through the head selecting switch 244 is established, and the contacts 485 permit the spindle head to be moved off of the switch 107' at a rapid traverse rate.

The opening of the dial indicator rapid traverse table switch 107 closes the normally open back contacts of the switch to shunt the contacts 105b of the table stop index switch 105. The shunting of the contacts 105b permits the table to be moved off the position in a back direction when the table has approached the desired position traveling in a forward direction. In the absence of such contacts switch 105 would prevent the operation of the motor in either direction and the table could not be moved from the position. The switch 107' is provided with similar contacts which shunt the contacts 105a of the switch 105 when the switch 107' is opened enabling the table to be moved from the position when it has reached the position by traveling forward. It is to be noted that the measuring rods 123, 124 hold the switches 107', 107 respectively, in their open positions until the table has been moved from the position a sufficient distance to close the switch 105 so that when the switch 107 or 107' is returned to its closed position the table movement will continue by reason of the fact that contacts 105a and 105b are closed.

The motor 21, like the motor 23 heretofore referred to, is provided with a "plugger" for bringing the same to rest instantaneously upon being disconnected from the line. The "plugger" switch, designated generally by the reference character 500, comprises normally open contacts 501 adapted to be closed when the motor is rotating in the direction to move the table forward and normally open contacts 502 adapted to be closed when the motor 21 is rotating in the direction to move the table back. When the motor is rotating in a direction to move the table forward, the normally closed contacts 460 of motor control panel 450 are open. These contacts 460 are in series with the contacts 501 of the plugger 500. As soon as the motor 21 is disconnected from the line, the contacts 460 close, completing a circuit from the wire 392, through the contacts 501, wire 503, contacts 460, wire 478, operating solenoid 479 of motor control panel 450, etc., to line L–2 so long as the motor continues to rotate in a forward direction. Energization of the operating solenoid 479 of motor control panel 450 connects the motor to the main line in such a manner that it tends to rotate in a reverse direction and instantaneously comes to rest. When the motor comes to rest, the contacts 501 open, breaking the circuit to the operating solenoid 479 of the motor control panel 450. When the motor is rotating in a reverse direction, with the operating solenoid 479 of the motor control panel 450 energized, normally closed contacts 504 of motor control panel 450 are open and contacts 502 of "plugger" switch 500 in series therewith are closed. Contacts 504 close upon disconnecting the motor from the line, establishing a circuit from the wire 392, through contacts 502, wire 505, contacts 504, wire 448, operating solenoid 449 of motor control panel 450, etc., to the line L–2, reversing the motor. When the motor stops rotating, which is instantaneously, the circuit to the operating solenoid 449 is broken by the opening of the contacts 502 of the "plugger" switch 500.

When the selecting switch 256 is turned to its "off" position, the operating circuits to relays 332 and 401 and the circuit to the indicating light 257 are broken. This, in turn, opens the circuit to the solenoid 45, allowing the movable element of clutch K to return to its neutral or disengaged position under the action of the spring 51, disconnecting the lead screw 40 from the motor 21. In the event that the movable clutch element of the clutch K does not immediately return to its neutral position upon deenergization of the operating solenoid 45, a circuit is established through the solenoid 72 upon the opening of relay 332 which causes the contacts 407 thereof to close. The solenoid 72 thereupon pulls the movable clutch element of clutch K into disengaged position. As the clutch K disengages the circuit through solenoid 72 is opened as the normally open contacts 485 of switch 102 are in series therewith. The circuit referred to is from the line L–1, through push button switch 258, wire 271, push button switch 261, wire 324, normally closed contacts 509 of relay 326, wire 511, normally closed contacts 512 of relay 329, wire 514, contacts 407 of relay 332 which close upon deenergization of relay 332 by returning table selecting switch 256 to its "off" position, wire 515, normally closed contacts 516 of time delay switch 517 which do not close until the motor has come to rest, wire 518, normally open contacts 485 of switch 102, which are now closed, wire 519, solenoid 72, wire 361, and overload contacts 362 to line L–2. Energization of the solenoid 72 instantaneously pulls the movable element of the clutch K to its neutral position whereupon the contacts 485 of switch 102 open breaking the circuit to the solenoid 72.

For a short period of time after the table selecting switch 256 is turned "off," the motor 21 will continue to rotate. During this interval, the clutch K will be under load and the spring 51 may not be strong enough to move the movable element but may be strong enough to disengage the clutch after the motor has stopped rotating, for which reason it is not necessary or desirable to energize the solenoid 72 to pull the movable element of the clutch K into disengaged position until after the motor 21 has come to rest. The operation of the solenoid 72 is delayed by the solenoid time delay relay 517, the operating solenoid 520 of which is energized from the line 324 through normally open contacts 459 or 521 of motor control panel 450 and wire 522 while the motor 21 is connected to the line, the contacts 516 of which time delay relay do not close upon deenergization of the operating solenoid 520 until a sufficient time has elapsed to allow the motor 21 to come to rest. When the motors 21 and 23 are jogged by means of the jog push button switch 258 all of the control circuits are deenergized between the interval that the normally closed contacts of the jog push button switch are opened and the time the normally open contacts thereof are closed. In the even that the selecting switch 256 is "on" when the jog push button switch 258 is depressed, the solenoid 65 which operates the clutch K is deenergized. If the spring 51 is not sufficient to disengage the clutch, the circuit referred to immediately above for energizing the solenoid 72 cannot be completed since the wire 271 and in turn the wires 324 and 518 are disconnected from the line L–1. However, under these circumstances, the wire 518 is connected to the line L–1 and the circuit established through the contacts 310 of relay 306, the operating solenoid 305 of which is energized upon the closing of the normally open contacts of the jog push button switch 258, thus avoiding any possibility of the clutch K remaining engaged and interfering with the subsequent operation of the machine. Alternatively, that side of the contacts 509 of relay 326 which is connected to the line 324 could be connected direct to the line L–1, in which event the contacts 310 of relay 306 could be disposed of. In this event the circuit through the solenoid 72 for pulling the clutch K into neutral position would be independent of the operation of the jog push button switch 258, and upon interrupting the circuit through solenoid 45 by depressing the jog push button switch 258, the circuit through the solenoid 72 would be established upon the contacts 516 of time relay relay 517 closing irrespective of whether or not the normally open contacts of jog push button switch 258 were closed.

From the foregoing description of the table control it will be apparent that the table can be moved in any desired direction provided the spindle 19 is rotating and the selecting switches 244, 250 and 262 which control the movement of the spindle head and backrest block, saddle, and spindle, respectively, are in their "off" positions, by turning the selecting switch 256 to its "on" position and depressing the desired push button. A jump feed can be obtained, that is, the table can be automatically caused to move at a rapid traverse rate on being fed in either direction if desired by movement of the switch 106 which opens the normally closed contacts thereof and closes its normally open contacts. In the event the table selecting switch 256 is "on" when the normally open contacts of the table "jump feed" rapid traverse switch 106 are closed a circuit is established from the line 392, through normally open contacts 402 of relay 332, which is now closed, wire 442, switch 106, wire 488, operating solenoid 489 of rapid traverse relay 490, wire 491, table dial indicator rapid traverse forward limit switch 107, wire 491' etc., 2L2. Energization of the solenoid 489 of the rapid traverse relay 490 energizes the rapid traverse clutch solenoid 86. The table will move at a rapid traverse rate until the switch 106 is returned to its normal position. The details of the operation of switch 106 are set out in the aforesaid patent and will not be further described herein.

*Spindle head and backrest block control*

To move the spindle head and backrest block, the selecting switch 244 is first turned to its "on" position. Assuming that the spindle feed is not operating and that the selecting switches 250 and 256 are "off," a circuit is then established from the line L–1 through jog push button switch 258, wire 271, normally closed contacts 359 of relay 320, wire 391, normally closed contacts 365 of relay 319, wire 392, selecting switch 244, wire 525, normally closed contacts 526 of motor control panel 527, wire 528, normally closed contacts 529 of motor control panel 527, wire 531, operating solenoid 532 of relay 326, wire 533, normally closed contacts 534 of relay 329, wire 535, and normally closed contacts 406 of relay 332, wire 537, normally closed contacts 538 of switch 100, wire 539, normally closed contacts 486 of switch 102 to L–2. In the event that either of the clutches J or K are engaged for any reason, the contacts 486 and 538 of the switches 102 and 100, respectively, will be open thus preventing the circuit from closing. Simultaneously, the operating solenoid 540 of relay 472 and the indicating light 245 are energized as they are connected in parallel with the operating solenoid 532 of relay 326. Energization of the operating solenoid of relay 326 closes the normally open contacts 541 and 542 and opens the normally closed contacts 509, 325, 396 and 545 thereof. Energization of the operating solenoid 540 of relay 472 closes the normally open contacts 546, 547, 548 and 549 and opens the normally closed contacts 497 thereof. The closing of the contacts 542 of relay 326 establishes a circuit from the wire 531 through the contacts 542, wire 519, solenoid 92, wire 361, and solenoid overload contacts 362 to L–2. Energization of the solenoid 72 shifts the movable clutch element 66, engaging the clutch L and connecting the lead screws 18 and 20 with the motor 21, and closing the normally open contacts 550 of switch 101 and opening the normally closed contacts 483 and 551.

The spindle head and backrest block can now be moved by depressing either of the "continuous" push buttons 240 and 241, or either of the "inch" push buttons 242 and 243. To feed the members up, the up "continuous" push button 240 is depressed, opening the normally closed contacts and closing the normally open contacts thereof. Closing of the normally open contacts establishes a circuit from the line L–1, through jog push button switch 258, wire 271, through the stop all feeds push button switch 261, wire 324, "up" feed and rapid traverse limit switch 143, wire 553, dial indicator feed up limit switch 105', wire 554, contacts 546 of relay 472, wire 555, normally open contacts of push button switch 240, wire 462, operating solenoid 463 of relay 464, wire 430, and either normally open contacts 431 or 432 of the motor control panel 280, depending upon the direction of rotation of the main driving motor 23, to line L–2. The closing of contacts 469 of relay 464 closes a circuit from the wire 531 through contacts 541 of relay 326, wire 556, transformer 557, wire 558, and contacts 469 to L–2, energizing the indicating light located in the push button 240, which indicating light is connected to the secondary of the transformer 557 by the wires 560 and 561.

The closing of contacts 467 of relay 464 completes a holding circuit therefor from the line L–1 through jog push button switch 258, wire 271, normally closed contacts of stop push button switch 261, wire 324, "up" feed and rapid traverse limit switch 143, wire 553, dial indicator feed up limit switch 105', wire 554, normally open contacts 547 of relay 472, wire 562, normally closed contacts of "inch" down push button switch 243, wire 563, normally closed contacts of "continuous" down push button switch 241, wire 477, contacts 467, wire 462, operating solenoid 463 of relay 464, wire 430, and contacts 431 or 432 to line L–2. This holding circuit maintains the relay 464 energized after the "continuous" up push button switch 240 has been released. The closing of contacts 468 of relay 464 completes a circuit from wire 477, through contacts 468, wire 478, operating solenoid 479 of motor control panel 450, wire 451, overload contacts 452 of motor control panel 450, wire 453, and overload contacts 454 of motor control panel 450 to L–2. Energization of the operating solenoid 479 of motor control panel 450 closes the contacts 480, 481, and 482 thereof connecting the motor 21 to the line in such a manner that it rotates in a direction to move the spindle head and backrest block up. The motor continues to operate until the limit switch 143 is opened by the spindle head reaching the end of its travel or until the feed stop push button switch 261 is depressed. When the motor is stopped, the holding circuit for relay 464 is broken and the indicating lamp in the continuous up push button switch 240 is extinguished.

The spindle head and backrest block can be inched up by depressing the "inch" up push button switch 242 closing the normally open contacts thereof. This establishes a circuit from the line L–1, through jog push button switch 258, wire 271, normally closed contacts of push button switch 261, wire 324, "up" feed and rapid traverse limit switch 143, wire 553, dial indicator feed up limit switch 105', wire 554, normally open contacts 546 of relay 472, wire 555, normally open contacts of "inch" up push button switch 242, wire 478, operating solenoid 479 of motor control panel 450, etc., to L–2. Energization of the operating solenoid 479 of the motor control panel 450 causes the main contacts 480, 481 and 482 thereof to close, connecting the motor to the line. The motor continues to operate as long as the "inch" up button switch 242 is depressed sufficient to hold the normally open contacts thereof closed.

The spindle head and backrest block can be moved down continuously by depressing the down "continuous" push button switch 241. This establishes a circuit from the line L–1, through jog push button switch 258, wire 271, normally closed contacts of stop all feeds push button switch 261, wire 324, spindle head down limit switch 143a, wire 565, contacts 549 of relay 472, wire 566, normally open contacts of "continuous" down push button switch 241, wire 427, operating solenoid 428 of relay 429, wire 430, and either contacts 431 or 432 of motor control panel 280 to L–2. The closing of contacts 433 of relay 429 establishes a circuit from wire 531, contacts 541 of relay 326, wire 556, transformer 567, wire 568, and contacts 433 to L–2. Energization of transformer 567 energizes the indicating lamp in the "continuous" down push button switch 241, which lamp is connected to the secondary of the transformer 567 by the wires 570 and 561.

The closing of contacts 434 of relay 429 establishes a holding circuit for the relay from the line L–2, through jog push button switch 258, wire 271, through the normally closed contacts of stop all feeds push button switch 261, wire 324, head down limit switch 136, wire 565, contacts 548 of relay 472, wire 573, normally closed contacts of push button switch 242, wire 574, normally closed contacts of continuous up push button switch 240, wire 447, contacts 434, wire 427, operating solenoid 428 of relay 429, wire 430, and contacts 431 or 432 of motor control panel 280 to line L–2. This holding circuit maintains the operating solenoid of the relay 429 energized after the push button switch 252 has been released. The closing of contacts 435 of relay 429 completes a circuit from the wire 447, through the contacts 435, wire 448, operating solenoid 449 of motor control panel 450, wire 451, overload contacts 452 of motor control panel 450, wire 453, and overload contacts 454 of motor control panel 450 to L–2. Energization of the operating solenoid 449 of the motor control panel 450 connects the feed and rapid traverse motor 21 to the main line in such a manner that the motor rotates in a direction to move the spindle head down. Simultaneously normally open contacts 458 and 459 of motor control panel 450 are closed and normally closed contacts 460 are opened.

The motor 21 continues to rotate as long as the holding circuit for the relay 429 is maintained and so long as the limit switch 143a remains closed. Upon the opening of either the limit switch 143a, jog push button switch 258, or stop all feeds push button switch 261, the circuit to the operating solenoid 449 of the motor control panel 450 is broken and the motor 21 disconnected from the line. Deenergizing the operating solenoid 428 of the relay 429 opens the primary circuit to the transformer 567 and extinguishes the indicating light. The spindle head and backrest block can be inched down by depressing the "inch" down push button switch 243. This closes a circuit from the line L–1, through jog push button switch 258, wire 271, stop all feeds push button 261, wire 324, spindle head down limit switch 143a, wire 565, contacts 549 of relay 498, normally open contacts of push button switch 243, wire 448, operating solenoid 449 of motor control panel 450, etc. Energization of the operating solenoid 449 of the motor control panel 450 causes the motor 21 to rotate in the same direction as previously referred to. The motor continues to rotate so long as the "inch" down push button switch 243 is depressed.

The spindle 19 must be rotating otherwise the spindle head, etc., cannot be moved since the contacts 431 and 432 are only closed when the main motor 23 is rotating in one direction or the other. With the motors 23 and 21 rotating, the spindle head can be rapid traversed in either direction, depending upon the direction of rotation of the motor 21 by merely depressing the normally open rapid traverse push button switch 260 to close the contacts thereof. This establishes a circuit from the line L–2, through jog push button switch 258, wire 271, normally closed contacts 359 of relay 320, wire 391, normally closed contacts 365 of relay 319, wire 392, rapid traverse push button switch 260, wire 488, and operating solenoid 489 of rapid traverse relay 490, wire 491, table dial indicator rapid traverse forward limit switch 107, wire 491', table dial indicator rapid traverse back limit switch 107', wire 492, spindle head dial indicator rapid traverse "up" limit switch 107'', wire 361, contacts 362 to L–2. Energization of the operating solenoid 489 of rapid traverse relay 490 closes the normally open contacts 493 thereof, completing a circuit from the wire 392, through the contacts 493, wire 494, solenoid 86, wire 361, contacts 362 to L–2. Energization of the solenoid 86 engages the normally disengaged friction clutch Q, causing the lead screws 18 and 20 to be rotated at a comparatively high rate of speed through the overrunning clutch device P. When the rapid traverse push button switch 260 is released, the solenoid 86 is deenergized and the friction clutch Q disengaged, thus stopping the rapid traverse movement.

As previously stated, spindle head switch 107'' is in parallel circuit with normally open contacts 473 of motor control panel 450 and normally closed contacts 410 of relay 401. The contacts 410 shunt out the table switches 107 and 107' unless the circuit through the table selecting switch 256 is established, and the contacts 473 and 473' shunt out the table switches 107 and 107' respectively when the solenoid 479 of motor control panel 450 is energized and the motor 21 so connected to the line in such a manner that it rotates in a direction to move the table away from the position. This latter construction allows the table to be moved off the table switch 107 or 107' at a rapid traverse rate. The contacts 497 shunt out the spindle head dial indicator rapid traverse forward limit switch 107'' unless the circuit through the head selecting switch 244 is established, and the contacts 458 permit the spindle head to be moved off of the spindle head dial indicator rapid traverse "up" limit switch 107'' at a rapid traverse rate.

When the selecting switch 244 is turned "off," the operating circuits to relays 326 and 472 and the circuit to the indicating light 245 are broken. This, in turn, opens the circuit to the solenoid 72, allowing the movable element of clutch L to return to its neutral or disengaged position under the action of the spring 74, disconnecting the lead screws 18 and 20 from the motor 21. In the event that the movable clutch element of the clutch L does not immediately return to its neutral position upon deenergization of the operating solenoid 72, a circuit is established through the solenoid 45 upon the opening of relay 326 which causes the contacts 509 thereof to close. The solenoid 45 thereupon pulls the movable clutch element of clutch L into disengaged position. As the clutch L disengages, the circuit through solenoid 45 is opened as the normally open contacts 550 of switch 101 are in series therewith. The circuit referred to is from the line L–1, through push button switch 258, wire 271, push button switch 261, wire 324, normally closed contacts 509 of relay 326, wire 511, normally closed contacts 512 of relay 329, wire 514, contacts 407 of relay 332, wire 515, normally closed contacts 516 of time delay switch 517 which do not close until the motor has come to rest, as previously explained, wire 518, normally open contacts 550 of switch 101, which are now closed, wire 411, solenoid 45, wire 361, and overload contacts 362 to line L–2. Energization of the solenoid 45 instantaneously pulls the movable element of the clutch L to its neutral position whereupon the contacts 550 of switch 101 open breaking the circuit to the solenoid 45.

The operation of the solenoid 45 is delayed until the motor 21 stops by the solenoid time delay relay 517, the operation of which has been described. When the motors 21 and 23 are jogged by means of the jog push button switch 258 all of the control circuits are de-energized between the interval that the normally closed contacts of the jog push button switch are opened and the time the normally open contacts thereof are closed. However, under these circumstances, the circuit through the solenoid 45 is established through the contacts 310 of relay 306, the operating solenoid 305 of which is energized upon the closing of the normally open contacts of the jog push button switch 258, thus avoiding any possibility of the clutch L remaining engaged and interfering with the subsequent operation of the machine.

*Backrest block clamp*

The normally closed contacts 526 and 529 of clamp motor control panel 527, which are in series with the head selecting switch 244, prevent operation of the spindle head and backrest block while the same are clamped to their respective columns. The backrest block G is clamped and unclamped to the backrest column D simultaneously with the clamping and unclamping of the spindle head C to the spindle head column B. When the clamping lever not shown, is rotated in a clockwise direction to clamp the spindle head C to the column B, a double throw clamp motor switch 230 associated therewith is operated to open the normally closed contacts thereof and close the normally open contacts. This established a circuit from the line L–1 through the normally open contacts of clamp motor switch 230, wire 598, operating solenoid 599 of clamp motor control panel 527 to L–2. Energization of the operating solenoid 599 of motor control panel 527 closes the normally open contacts 622, 623, and 624, connecting the clamp motor 25 to the line in such a manner that it rotates in a direction to clamp the backrest block G to the column D. Energization of the operating solenoid 599 of motor control panel 527 also opens the normally closed contacts 529 and 530 thereof. As previously stated, contacts 529 are connected in series with the spindle head and backrest block selecting switch 244 and the opening of these contacts prevents movement of the spindle head or backrest block while the same are clamped to the ways.

When the clamp lever is rotated in a counterclockwise direction to unclamp the spindle head C from the column B and the backrest block G from the column D, the normally open contacts of clamp motor switch 230 are opened and the normally closed contacts thereof closed, deenergizing the operating solenoid 599 of motor control panel 527 and closing contacts 530. This establishes a circuit from the line L–1, through normally closed contacts of clamp motor switch 230, wire 625, normally closed contacts 530, wire 626, operating solenoid 627 of motor control panel 527, wire 628, clamp motor limit switch 232 to L–2. Energization of the operating solenoid 627 of motor control panel 527 closes the main contacts 630, 631 and 632 thereof, connecting the motor 25 to the main line in such a manner that it rotates in a reverse direction, that is, in a direction to unclamp the backrest block G from the column D. Simultaneously contacts 526 in series with head selecting switch 244 are opened. When the backrest block G is unclamped, the circuit to the operating solenoid 627 of motor control panel 527 is broken by the opening of clamp motor limit switch 232. It will be noted that the switch 230 is connected directly to the line L–1. This is an important feature as with this arrangement the circuits to the clamp motor 25 are not disturbed when the jog push button switch 258 is depressed, irrespective of whether the clamp switch is of the double or single pole type.

From the foregoing description, it will be apparent that the spindle head and backrest block can be moved in any desired direction provided they are unclamped from their respective columns, the spindle 19 is rotating, and the selecting switches 250, 256, and 262 which control the movement of the saddle, table, and spindle, respectively, are in their "off" positions, by turning the selecting switch 244 to its "on" position and depressing the desired push button on the pendant control station H.

The spindle head and backrest block can be repeatedly stopped at a predetermined point while moving in an upward direction through the medium of the spindle head dial indicator rapid traverse limit switch 107″ and the spindle head dial indicator stop limit switch 105′. When the spindle head dial indicator rapid traverse limit switch 107″ is opened the rapid traverse friction clutch solenoid 86 is deenergized and when the spindle head dial indicator stop limit switch 105′ is opened by continued movement of the spindle head at feed rate, the spindle head, etc., stop instantaneously because of the "plugging" circuits associated with the motor 21.

*Saddle*

To move the saddle, the selecting switch 250 is first turned to its "on" position. Assuming that the spindle feed is not operating, in which event contacts 359 and 365 of relays 320, 319 respectively are closed, and that the selecting switches 244 and 256 are "off," a circuit is then established from the line L–1, through jog push button switch 258, wire 271, normally closed contacts 359 and relay 320, wire 391, normally closed contacts 365 of relay 319, wire 392, selecting switch 250, wire 575, operating solenoid 576 of relay 329, wire 577, saddle clamp limit switch 578, wire 579, normally closed contacts 545 of relay 326, wire 580, and normally closed contacts 405 of relay 394, wire 582, normally closed contacts 551 of switch 101, wire 583, normally closed contacts 487 of switch 102 to L–2. In the event that either of the clutches K or L is engaged for any reason, the contacts 551 and 487 of the switches 101 and 102, respectively, will be open thus preventing the circuit from closing. Simultaneously, the operating solenoid 584 of relay 585 and the indicating light 251 are energized as they are connected in parallel with the operating solenoid 576 of relay 329. Energization of the operating solenoid 576 of relay 329 closes the normally open contacts 586 and opens the normally closed contacts 398, 512, 534 and 328 thereof. Energization of the operating solenoid 584 of relay 585 closes the normally open contacts 589, 590, 591, 592 and 593. The closing of the contacts 593 of relay 585 establishes a circuit from the wire 575, through the contacts 593, wire 594, solenoid 35, wire 361, and solenoid overload contacts 362 to L–2. Energization of the solenoid 35 shifts the movable clutch element 33, engaging the clutch J and connecting the lead screw 28 with the motor 21, and closing the normally open contacts 595 of switch 100 and opening the normally closed contacts 484 and 538.

The saddle can now be moved along the bed by depressing either of the "continuous" push buttons 246 and 247, or either of the "inch" push buttons 248 and 249. To feed the saddle to the right, the right "continuous" push button 246 is depressed, opening the normally closed contacts and closing the normally open contacts thereof. Closing of the normally open contacts establishes a circuit from the line L–1, through jog push button switch 258, wire 271, through the stop all feeds push button switch 261, wire 324, saddle feed and rapid traverse right limit switch 145, wire 601, contacts 591 of relay 585, wire 602, normally open contacts of push button switch 246, wire 427, operating solenoid 428 of relay 429, wire 430, and either normally open contacts 431 or 432 of the motor control panel 280, depending upon the direction of rotation of the main driving motor 23, to line L–2. The closing of contacts 436 of relay 429 closes a circuit from the wire 575, through the contacts 586 of relay 329, wire 603, transformer 604, wire 605, and contacts 436 to L–2, energizing the indicating light located in the push button 246, which indicating light is connected to the secondary of the transformer 604 by the wires 607 and 608.

The closing of contacts 434 of relay 429 establishes a holding circuit for the relay from the line L–2, through jog push button switch 258, wire 271, through the normally closed contacts of stop all feeds push button switch 261, wire 324, saddle feed and rapid traverse right limit switch 145, wire 601, contacts 592 of relay 585, wire 609, normally closed contacts of push button switch 249, wire 610, normally closed contacts of continuous left push button switch 247, wire 447, contacts 434, wire 427, operating solenoid 428 of relay 429, wire 430, and contacts 431 or 432 of motor control panel 280 to line L–2. This holding circuit maintains the operating solenoid of the relay 429 energized after the push button switch 246 has been released. The closing of contacts 435 of relay 429 completes a circuit from the wire 447, through the contacts 435, wire 448, operating solenoid 449 of motor control panel 450, wire 451, overload contacts 452 of motor control panel 450, wire 453, and overload contacts 454 of motor control panel 450 to L–2. Energization of the operating solenoid 449 of the motor control panel 450 connects the feed and rapid traverse motor 21 to the main line in such a manner that the motor rotates in a direction to move the saddle to the right. Simultaneously normally open contacts 458 and 459 of motor control panel 450 are closed and normally closed contacts 460 are opened.

The motor 21 continues to rotate as long as the holding circuit for the relay 429 is maintained and so long as the limit switch 145 remains closed. Upon the opening of either the limit switch 145, jog push button switch 258, or stop all feeds push button switch 261, the circuit to the operating solenoid 449 of the motor control panel 450 is broken and the motor 21 disconnected from the line. Deenergizing the operating solenoid 428 of the relay 429 opens the primary circuit to the transformer 604 and extinguishes the indicating light in the continuous right push button switch 246. The saddle can be "inched" to the right by depressing the "inch" right push button switch 248. This closes a circuit from the line L–1, through jog push button switch 258, wire 271, stop all feeds push button 261, wire 324, saddle feed and rapid traverse limit switch 145, wire 601, contacts 591 of relay 585, wire 602, normally open contacts of push button switch 248, wire 448, operating solenoid 449 of motor control panel 450, etc. Energization of the operating solenoid 449 of the motor control panel 450 closes the main contacts 455, 456 and 457 thereof, causing the motor 21 to rotate in the same direction as previously referred to. The motor continues to rotate so long as the "inch" right push button switch 248 is depressed.

The saddle can be moved to the left continuously by depressing the "continuous" left push button switch 247. This establishes a circuit from the line L–1, through jog push button switch 258, wire 271, normally closed contacts of stop all feeds push button switch 261, wire 324, saddle feed and rapid traverse left limit switch 146, wire 612, contacts 589 of relay 585, wire 613, normally open contacts of "continuous" left pushbutton switch 247, wire 462, operating solenoid 463 of relay 464, wire 430, and either contacts 431 or 432 of motor control panel 280 to L–2. The closing of contacts 465 of relay 464 establishes a circuit from wire 575, contacts 586 of relay 329, wire 603, transformer 615, wire 616, and contacts 465 to L–2. Energization of transformer 615 energizes the indicating lamp in the "continuous" left push button switch 247, which lamp is connected to the secondary of the transformer 615 by the wires 608 and 619.

The closing of contacts 467 of relay 464 completes a holding circuit therefor from the line L–1, through jog push button switch 258, wire 271, normally closed contacts of stop push button switch 261, wire 324, saddle feed and rapid traverse left limit switch 146, wire 612, normally open contacts 590 of relay 585, wire 620, normally closed contacts of "inch" right push button switch 248, wire 621, normally closed contacts of "continuous" right push button switch 246, wire 477, contacts 467, wire 462, operating solenoid 463 of relay 464, wire 430, and contacts 431 or 432 to line L–2. This holding circuit maintains the relay 464 energized after the "continuous" left push button switch 247 has been released. The closing of contacts 468 of relay 464 completes a circuit from wire 477, through contacts 468, wire 478, operating solenoid 479 of motor control panel 450, wire 451, overload contacts 452 of motor control panel 450, wire 453, and overload contacts 454 of motor control panel 450 to L–2. Energization of the operating solenoid 479 of motor control panel 450 closes the contacts 480, 481, and 482 thereof connecting the motor 21 to the line in such a manner that it rotates in a direction to move the saddle to the left. The motor continues to operate until the limit switch 146 is opened by the saddle reaching the end of its travel or until the feed stop push button switch 261 is depressed. When the motor is stopped, the holding circuit for relay 464 is broken and the indicating lamp in the continuous left push button switch 247 is extinguished.

The saddle can be inched to the left by depressing the "inch" left push button switch 249 closing the normally open contacts thereof. This establishes a circuit from the line L–1, through jog push button switch 258, wire 271, normally closed contacts of push button switch 261, wire 324, saddle feed and rapid traverse left limit switch 146, wire 612, normally open contacts 580 of relay 585, wire 613, normally open contacts of "inch" left push button switch 249, wire 478, operating solenoid 479 of motor control panel 450, etc., to L–2. Energization of the operating solenoid 479 of the motor control panel 450 causes the main contacts 480, 481 and 482 thereof to close, connecting the motor to the line. The motor continues to operate as long as the "inch" push button switch 249 is depressed sufficiently to hold the normally open contacts thereof closed.

The spindle 19 must be rotating otherwise the table, spindle head and backrest block, or the saddle cannot be moved since the contacts 431 and 432 are only closed when the main motor 23 is rotating in one direction or the other. With the motors 23 and 21 rotating, the saddle can be rapid traversed in either direction, depending upon the direction of rotation of the motor 21 by merely depressing the normally open rapid traverse push button switch 261 to close the contacts thereof. The circuits established are similar to those described with reference to the table, spindle head and backrest block controls, except that in the present instance the dial indicator rapid traverse switches 107, 107′, and 107″ are both shunted out. When the rapid traverse push button switch 260 is released, the solenoid 86 is deenergized, the friction clutch Q disengaged, and the rapid traverse movement stopped.

When the selecting switch 250 is turned to its "off" position, the operating circuits to relays 329 and 585 and the circuit to the indicating light 251 are broken. This, in turn, opens the circuit to the solenoid 35, allowing the movable element of clutch J to return to its neutral or disengaged position under the action of the spring 38, disconnecting the lead screw 28 from the motor 21. In the event that the movable clutch element of the clutch J does not immediately return to its neutral position upon deenergization of the operating solenoid 35, a circuit is established through the solenoid 72 upon the opening of relay 329 which causes the contacts 512 thereof to close. The solenoid 72 thereupon pulls the movable clutch element of clutch J into disengaged position. As the clutch J disengages the circuit through solenoid 72 is opened as the normally open contacts 595 of switch 100 are in series therewith. The circuit referred to is from the line L-1, through push button switch 258, wire 271, push button switch 261, wire 324, normally closed contacts 509 of relay 326, wire 511, normally closed contacts 512 of relay 329, wire 514, contacts 407 of relay 332, wire 515, normally closed contacts 516 of time delay relay 517 which do not close until the motor has come to rest, as previously referred to, wire 518, normally open contacts 595 of switch 100, which are now closed, wire 519, solenoid 72, wire 361, and overload contacts 362 to line L-2. Energization of the solenoid 72 instantaneously pulls the movable element of the clutch J to its neutral position whereupon the contacts 595 of switch 100 open breaking the circuit to the solenoid J.

The operation of the solenoid 72 is delayed until the motor 21 stops by the solenoid time delay relay 517, the operation of which has been described. When the motors 21 and 23 are jogged by means of the jog push button switch 258 all of the control circuits are deenergized. However, under these circumstances, the circuit through the solenoid 72 is established by contacts 310 of relay 306, the operating solenoid 305 of which is energized upon the closing of the normally open contacts of the jog push button switch 258, thus avoiding any possibility of the clutch J remaining engaged and interfering with the subsequent operation of the machine.

From the foregoing description of the saddle control it will be apparent that the saddle can be moved in any desired direction provided the spindle 19 is rotating and the selecting switches 244, 256, and 262 which control the movement of the table, spindle head and backrest block, and spindle, respectively, are in their "off" positions, by turning the selecting switch 250 to its "on" position and depressing the desired push button on the pendant control station H.

*Backrest column control*

According to the provisions of the present invention, the backrest column D can be moved along the horizontal ways of the bed by a reversible electric motor 26 (see Fig. 10) secured to the rear side of the backrest column and operatively connected to the saddle lead screw 54 in a manner known in the art. The motor 26 is controlled by two push button switches 237 and 238 (see Fig. 7) located underneath the backrest column clamp lever 239. The construction is such that the switches cannot be operated unless the backrest column clamp lever is in a position to unclamp the column from the ways. Depressing the backrest column left push button switch 237 establishes a circuit from the line L-1, through normally closed contacts of jog push button switch 258, wire 271, stop all feeds push button switch 261, wire 324, saddle right limit switch 145, wire 601, switch 237, wire 638, operating solenoid 639 of motor control panel 640, wire 641, normally closed overload contacts 642, wire 643, and normally closed overload contacts 644 of motor control panel 640 to line L-2. Energization of the operating solenoid 639 of motor control panel 640 closes the main contacts 645, 646 and 647, connecting the motor 26 to the main line in such a manner that the motor is rotated in a direction to move the backrest column G towards the left. When the backrest column left push button switch 237 is released, the circuit to the solenoid 639 is broken and the motor stopped. The fact that the backrest column left push button switch 237 is in series circuit with the saddle right limit switch 145 prevents one member from being moved against the other. The backrest column D is moved in a reverse direction by depressing the normally open backrest column right push button switch 238. This establishes a circuit from the line L-1, through normally closed contacts of jog push button switch 258, wire 271, push button switch 238, wire 648, operating solenoid 649 of motor control panel 640, wire 641, overload contacts 642, wire 643, and overload contacts 644 to L-2. Energization of the operating solenoid 649 of motor control panel 640 closes the main contacts 650, 651 and 652 thereof connecting the motor 26 to the line in such a manner that it rotates in a reverse direction. When the push button switch 238 is released, the circuit to the operating solenoid 649 of motor control panel 640 is broken, and the motor stops.

The present invention is particularly advantageous when used in connection with mass production work. If a job is to be repeated at various intervals a cap 660 adapted to be fastened by suitable screws to the end of rotatable member 128 of turret 127 may be provided as illustrated in Figs. 11 and 12. The cap 660 has a plurality of circumferentially spaced cylindrical bores 661 to receive push rods 662. The bottoms 664 of the bores 661 are ground to provide an accurately positioned surface and the push rods 662 are accurately cut and polished to accurately control the movements of the table F to the various positions required for the piece which is being mass produced. After one group of pieces have been produced the rods 662 may be removed and stored until the same piece is to be produced again.

The use of mechanism which permits positioning of the table from either direction facilitates moving the table considerable distances between the various operations such as occurs when the machine is used to drill widely spaced holes in a workpiece carried by the table. The machine may be quickly set up to drill widely spaced holes by first locating the workpiece in proper position on the table for drilling the first hole and by then adjusting the turret mounting the rod for stopping the table at the position so that the push rod engages a gauge rod, say gauge rod 123, and depresses it a sufficient distance to actuate the switch 105 and cause the dial indicating mechanism 129 to indicate zero or some other reference deflection. The table may then be operated to cause it to approach the position and be stopped by the actuation of switch 105. After the table stops, the dial indicator is checked and the push rod adjusted to a position where the deflection is the same as the original or reference deflection. At this point the particular push rod may be rotated out of engagement with the gauge rod 123 and a setup rod, cut to a length equal to a distance between the holes, may be used to depress the gauge rod 124 of the positioning mechanism to a point where the dial indicating mechanism indicates zero and the other turret moved to a position where the push rod mounted therein for controlling the position of the table for drilling the other hole engages or "kisses" the end of the gauge rod 124. From the foregoing it will be seen that the present invention is particularly adaptable for use where the workpieces are to be mass produced at various time intervals.

The foregoing description has been directed toward the control means for table F enabling it to be accurately positioned when approaching the position from either of two directions. It will be well understood by those skilled in the art that a similar control can be applied to either the saddle or the spindle head or both, or embodied in a different type of machine tool for positioning a movable member thereof. While we have shown the switches as being mounted on the saddle and the actuating rods as being mounted on the table, the mounting of these could be reversed without departing from the spirit or scope of the present invention.

It can be seen from the foregoing that the present invention provides a means for accurately positioning a movable member of a machine tool from either of two directions and includes means to indicate the accuracy of the final positioning of the member. The control circuits for the machine are so constructed and arranged that the member may be rapid traversed off the position to which it has been moved.

While the preferred embodiment of the invention has been described with considerable detail I do not wish to be limited to the particular construction which may be varied within the scope of this invention and it is my intention to hereby cover all adaptations, modifications and variations which come within the practice of those skilled in the art to which the invention relates and which fall within the scope of the appended claim.

Having thus described my invention I claim:

In combination with a machine tool or the like having a supporting member, a movable member supported by said supporting member for movement to a predetermined position from either of two directions, and power actuated means for moving said movable member at a rapid traverse rate and at a feed rate, a pair of spaced abutments on one of said members, switch means for controlling the operation of said power actuated means comprising a first switch mounted on said supporting member for changing the movement of said movable member from rapid traverse to feed, a first operating member for operating said first switch, a second switch on said supporting member for changing the movement of said movable member from rapid traverse to feed, a second operating member for operating said second switch, means supporting said first and second operating members for movement toward each other, a third switch mounted on said supporting member for stopping said movable member at said position, a third operating member for operating said third switch, pivoted means pivotally mounted on said supporting member intermediate said first and second operating members and engageable with said third operating member to operate said third switch, said first operating member and said second operating member engaging said pivoted means subsequent to operating their respective switches, one of said abutments being adapted to engage and move said first operating member when said movable member approaches said position from one direction and the other of said abutments being adapted to engage and move said second operating member when said movable member approaches said position from the other of said directions, the movement of said first and second operating members by their respective abutments first causing the operation of the corresponding switch to change the speed of said movable member and subsequently causing the movement of said pivoted means to actuate said third operating member to operate said third switch to stop the movement of said movable member.

References Cited in the file of this patent

UNITED STATES PATENTS

| | | |
|---|---|---|
| 1,231,946 | Schellenbach | July 3, 1917 |
| 1,686,743 | Dull | Oct. 9, 1928 |
| 1,942,209 | Graves et al. | Jan. 2, 1934 |
| 2,007,180 | Doran et al. | July 9, 1935 |
| 2,339,435 | Stephan | Jan. 18, 1944 |
| 2,350,174 | Lucas et al. | May 30, 1944 |
| 2,604,000 | Kjellberg | July 22, 1952 |
| 2,643,441 | Gallimore | June 30, 1953 |

FOREIGN PATENTS

| | | |
|---|---|---|
| 660,416 | Great Britain | Nov. 7, 1951 |